United States Patent
Lentz et al.

(10) Patent No.: US 9,760,968 B2
(45) Date of Patent: Sep. 12, 2017

(54) REDUCTION OF GRAPHICAL PROCESSING THROUGH COVERAGE TESTING

(71) Applicant: SAMSUNG ELECTRONICS COMPANY, LTD., Suwon, Gyeonggi-do (KR)

(72) Inventors: Derek Lentz, Sun Valley, NV (US); Michael Shebanow, San Jose, CA (US); Ignacio Llamas, Sunnyvale, CA (US)

(73) Assignee: Samsung Electronics Co., Ltd. (KR)

( * ) Notice: Subject to any disclaimer, the term of this patent is extended or adjusted under 35 U.S.C. 154(b) by 231 days.

(21) Appl. No.: 14/530,316

(22) Filed: Oct. 31, 2014

(65) Prior Publication Data

US 2015/0325037 A1 Nov. 12, 2015

Related U.S. Application Data

(60) Provisional application No. 61/991,343, filed on May 9, 2014.

(51) Int. Cl.
*G06T 1/20* (2006.01)
*G06T 15/10* (2011.01)
*G06T 11/00* (2006.01)
*G06T 15/00* (2011.01)

(52) U.S. Cl.
CPC ............ *G06T 1/20* (2013.01); *G06T 11/00* (2013.01); *G06T 11/001* (2013.01); *G06T 15/005* (2013.01); *G06T 15/10* (2013.01)

(58) Field of Classification Search
None
See application file for complete search history.

(56) References Cited

U.S. PATENT DOCUMENTS

| | | |
|---|---|---|
| 5,977,977 A | 11/1999 | Kajiya et al. |
| 6,252,608 B1 | 6/2001 | Snyder et al. |
| 6,504,542 B1 | 1/2003 | Voorhies et al. |
| 6,697,063 B1 | 2/2004 | Zhu |
| 6,867,781 B1 | 3/2005 | Van Hook et al. |
| 6,989,835 B2 | 1/2006 | Deering et al. |
| 7,109,987 B2 | 9/2006 | Goel et al. |
| 7,184,059 B1 | 2/2007 | Fouladi et al. |
| 7,190,366 B2 | 3/2007 | Hutchins et al. |

(Continued)

FOREIGN PATENT DOCUMENTS

| | | |
|---|---|---|
| CN | 102096897 B | 5/2015 |
| WO | 2014085004 A1 | 6/2015 |

OTHER PUBLICATIONS

Pool, J., "Energy-Precision Tradeoffs in the Graphics Pipeline", Chapel Hill, 2012, pp. 1-158, University of North Carolina, United States.

(Continued)

*Primary Examiner* — Said Broome
(74) *Attorney, Agent, or Firm* — Innovation Counsel LLP

(57) ABSTRACT

A method for using a graphics processor by an electronic device for subdividing an input image into multiple sub-regions. For each particular sub-region, a data structure is created that identifies one or more primitives that are visible in each quad of the particular sub-region. Existing coverage of one or more quads is erased based on graphics state (GState) information resulting in surviving coverage for one or more quads.

26 Claims, 10 Drawing Sheets

(56) References Cited

U.S. PATENT DOCUMENTS

| | | |
|---|---|---|
| 7,508,390 B1 | 3/2009 | Demers |
| 7,554,538 B2 | 6/2009 | Wexler et al. |
| 7,623,132 B1 | 11/2009 | Bastos et al. |
| 8,115,767 B2 | 2/2012 | Stich |
| 8,144,156 B1 | 3/2012 | Baldwin |
| 8,254,455 B2 | 8/2012 | Wu et al. |
| 8,384,736 B1 | 2/2013 | Lindholm et al. |
| 8,427,487 B1 * | 4/2013 | Crow .................. G06T 11/40 345/501 |
| 8,446,409 B2 | 5/2013 | Howson |
| 8,448,067 B2 | 5/2013 | Cerny et al. |
| 8,595,425 B2 | 11/2013 | Minkin et al. |
| 8,619,085 B2 | 12/2013 | Keall et al. |
| 2002/0196252 A1 * | 12/2002 | Liao .................. G06T 15/40 345/422 |
| 2011/0234592 A1 | 9/2011 | Patel et al. |
| 2011/0254852 A1 | 10/2011 | Howson |
| 2013/0113790 A1 | 5/2013 | Kazakov |
| 2013/0241938 A1 * | 9/2013 | Gruber .................. G06T 11/40 345/501 |
| 2015/0379672 A1 | 12/2015 | Wang |

OTHER PUBLICATIONS

Govindaraju, N.K. et al., "Fast and Reliable Collision Culling using Graphics Hardware", Proceedings of the ACM Symposium on Virtual Reality Software and Technology (VRST'04), Nov. 10-12, 2004, pp. 1-8, ACM, United States.

NVIDIA Corporation, "NVIDIA Tegra 4 Family GPU Architecture", Feb. 2013, pp. 1-26, United States.

Imagination Technologies Ltd., "POWERVR Series5 Graphics SGX architecture guide for developers—Tile Based Deferred Rendering (TBDR)", Jul. 5, 2011, p. 8, Version 1.0.8, United Kingdom.

Sugerman, J. et al., "GRAMPS: A Programming Model for Graphics Pipelines", Journal of ACM Transactions on Graphics (TOG), Jan. 2009, pp. 1-19, vol. 28, Issue 1, ACM, United States.

Patney, A. et al., "Piko: A Design Framework for Programmable Graphics Pipelines", Jan. 30, 2015, pp. 1-13, Cornell University, United States.

Merry, B., "Performance Tuning for Tile-Based Architectures", Jul. 23, 2012, pp. 323-355, OpenGL Sights, United States.

Antochi, I., "Suitability of Tile-Based Rendering for Low-Power 3D Graphics Accelerators", Proefschrift, Oct. 29, 2007, pp. 1-163, Universitatea Politehnica Bucuresti, Romania.

* cited by examiner

REDUCTION OF GRAPHICAL PROCESSING THROUGH COVERAGE TESTING

CROSS-REFERENCE TO RELATED APPLICATIONS

This application claims the priority benefit of U.S. Provisional Patent Application Ser. No. 61/991,343, filed May 9, 2014, which is incorporated herein by reference in its entirety.

TECHNICAL FIELD

One or more embodiments generally relate to reduction of graphical computations and, in particular, to reduction of graphical processing unit (GPU) processing based on coverage testing, reduced data fetching and reduced pixel shader processing.

BACKGROUND

Graphical processing units (GPUs) are primarily used to perform graphics rendering. Graphics rendering requires massive amounts of computation, especially in shader programs that are run while rendering. This computation requires a very large percentage of the power consumed by GPUs, and thus electronic devices that employ GPUs. In mobile electronic devices, processing power of GPUs, memory and power supplied by battery is limited due to the form factor and mobility of the electronic device.

SUMMARY

One or more embodiments generally relate to reduction of graphical processing unit (GPU) processing based on coverage testing, reduced data fetching and reduced pixel shader processing. In one embodiment, a method provides using a graphics processor by an electronic device for subdividing an input image into multiple sub-regions. In one embodiment, for each particular sub-region, a data structure is created that identifies one or more primitives that are visible in each quad of the particular sub-region. In one embodiment, existing coverage of one or more quads is erased based on graphics state (GState) information resulting in surviving coverage for one or more quads.

In one embodiment a non-transitory computer-readable medium having instructions which when executed on a computer perform a method comprising: using a graphics processor for subdividing an input image into a plurality of sub-regions. In one embodiment, for each particular sub-region, a data structure is created that identifies one or more quads that are visible in each quad of the particular sub-region. In one embodiment, existing coverage of one or more quads are erased based on graphics state (GState) information resulting in surviving coverage for one or more quads.

In one embodiment, a graphics processor for an electronic device comprises: one or more processors coupled to a memory. In one embodiment, the one or more processors comprise: a preprocessing module that subdivides an input image into a plurality of sub-regions and, for each particular sub-region, creates a data structure that identifies one or more primitives that are visible in each quad of the particular sub-region. In one embodiment, a first graphics processing stage: erases existing coverage of one or more quads based on graphics state (GState) information resulting in surviving coverage for one or more quads.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
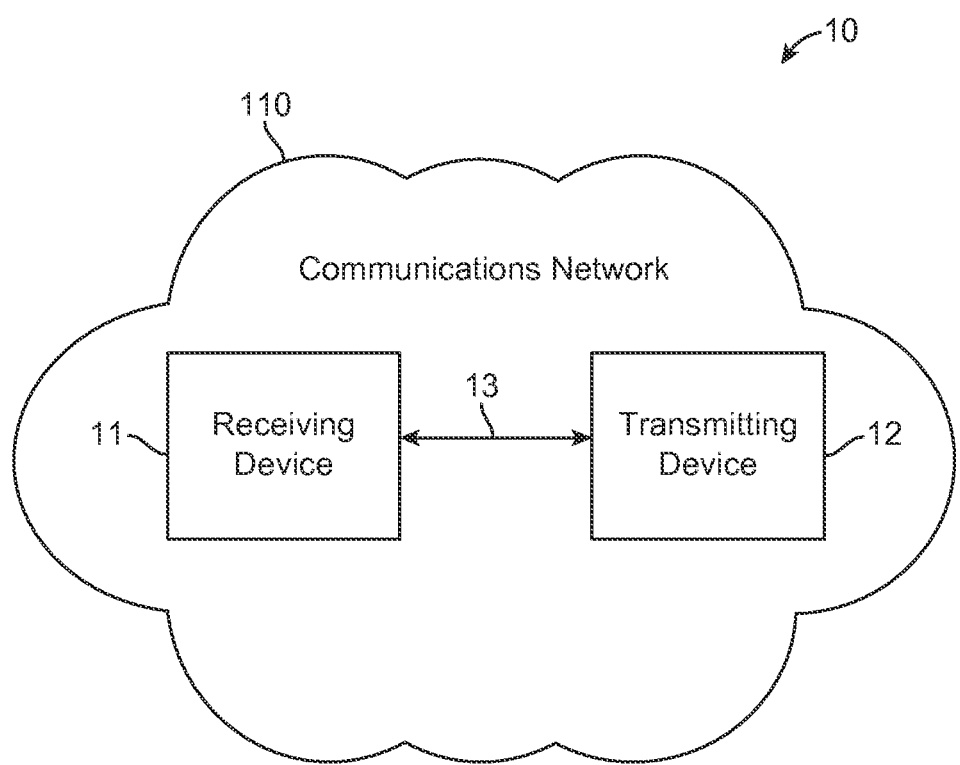
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments minimize computation in the pixel shader processes that are the most frequently run in the graphical processing unit (GPU) of electronic devices (e.g., mobile electronic devices). One or more embodiments provide for power reductions by reducing data read from memory devices, such as dynamic random access memory (DRAM), and for improving texture cache hit rates. One or more embodiments operate in tile based deferred rendering GPU architectures. One or more embodiments perform a limited amount of work to determine the coverage of each primitive (which pixel samples on a display screen result in visible results) without running the power consuming pixel shaders or only running a small portion of them when absolutely required. One embodiment maintains the coverage of each primitive that retains coverage (when primitives have no more coverage they are removed). In one example embodiment, after the complete image has been processed, a further processing step is used to perform the final rendering using the previously generated coverage information, and computation using the expensive pixel shader programs is minimized. In one or more embodiments, performance and power critical DRAM bandwidth associated with the fetching of attributes is minimized, and texture fetching and computation is also minimized. In one embodiment, the order of texture fetching is optimized for cache performance and memory bandwidth minimization.

One or more embodiments comprise a hardware architecture that uses coverage information and coverage filtering to minimize shader computation and the resulting power due to graphics rendering. In one example embodiment, coverage computation uses less processing (and power) to compute as compared to final color computation (and most of the time eliminates pixel shader execution). In one example embodiment, coverage is only computed once, regardless of depth order (i.e. front to back order). In one embodiment, texture accesses are eliminated that do not contribute to the visible image, and texture accesses are reordered so that the texture cache accesses are optimized. In one example, memory bandwidth consumed by vertex attribute fetching is reduced to the absolute minimum required to create a correct final visible image. One or more embodiments provide processing that is independent of the order of primitives supplied by a rendering application.

In one embodiment, a method provides using a graphics processor by an electronic device for subdividing an input image into multiple sub-regions. In one embodiment, for each particular sub-region, a data structure is created that identifies one or more primitives that are visible in each quad of the particular sub-region. In one embodiment, existing coverage of one or more quads is erased based on graphics state (GState) information resulting in surviving coverage for one or more quads. In one embodiment, color values are computed using a particular second shader for quads with samples that have surviving coverage. In one embodiment, a rendered image is generated using output color values of the second particular shader. In one embodiment, GState information is the graphics state associated with a draw call or set of draw calls. In one embodiment, GState is a state data that is provided by the application program to control how application provided graphics data is accessed and used by the GPU. In one embodiment, GState is dynamic in that it changes over time within a given image. In one embodiment, multiple GStates are required in the hardware at any given time. In one embodiment, in the shader stages, for example, multiple GStates may be required by different Warps (any given Warp must utilize exactly one).

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
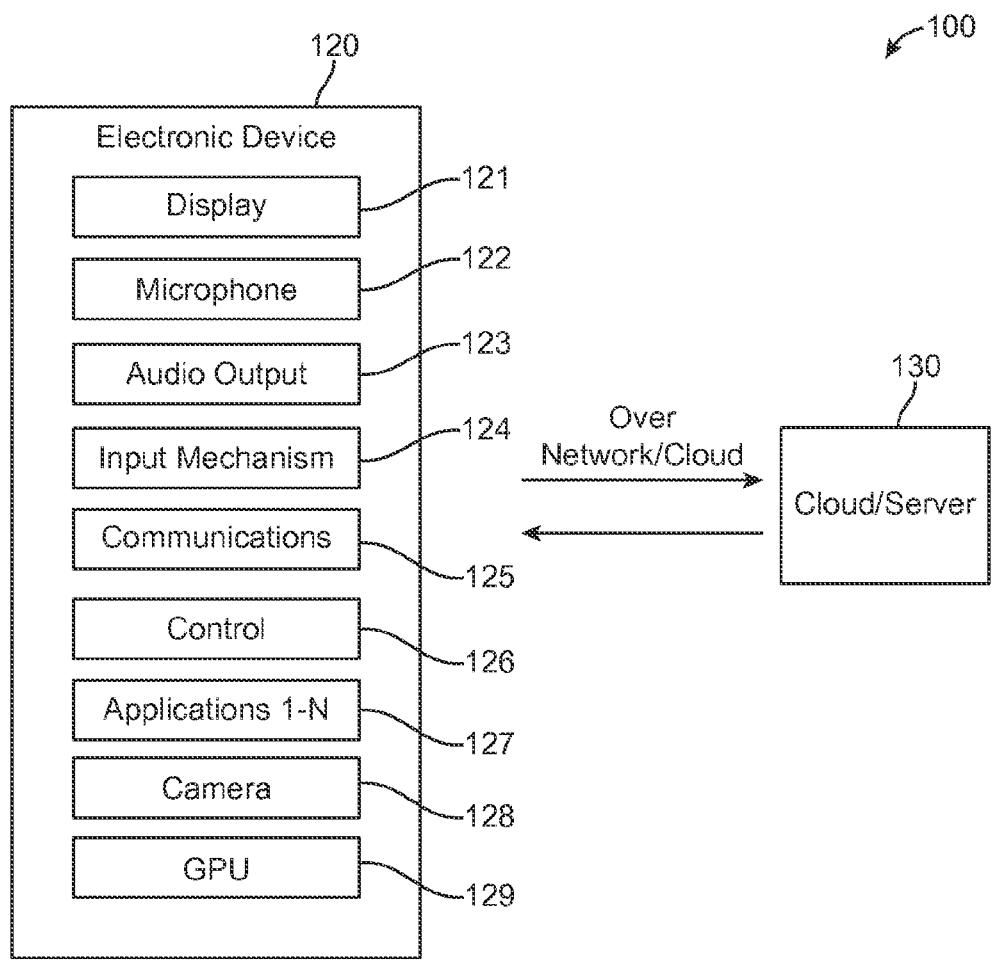
FIG. 2 shows a block diagram of architecture for a system including a mobile device including a graphical processing unit (GPU) module, according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a GPU module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the GPU module 129 comprises processes and/or programs for processing images and portions of images for rendering on the display 121 (e.g., 2D or 3D images). In one or more embodiments, the GPU module may comprise GPU hardware and memory (e.g., DRAM, cache, etc.). In one embodiment, the GPU module 129 collects final coverage information (remaining coverage) for an entire tile, removes pixels shaders for quads and primitives that have no coverage remaining, and generates a final image from surviving coverage that has been accumulated. In one embodiment, the GPU module 129 uses three steps: a binning phase, which is identical to those typically used with the standard tile-based deferred rendering (TBDR) or Z Prepass pipelines, a Coverage rendering phase 300 (FIG. 4), which is similar to Z prepass, and the Color rendering phase (FIG. 5), which is quite different from a color pass that would typically be performed after a Z prepass.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
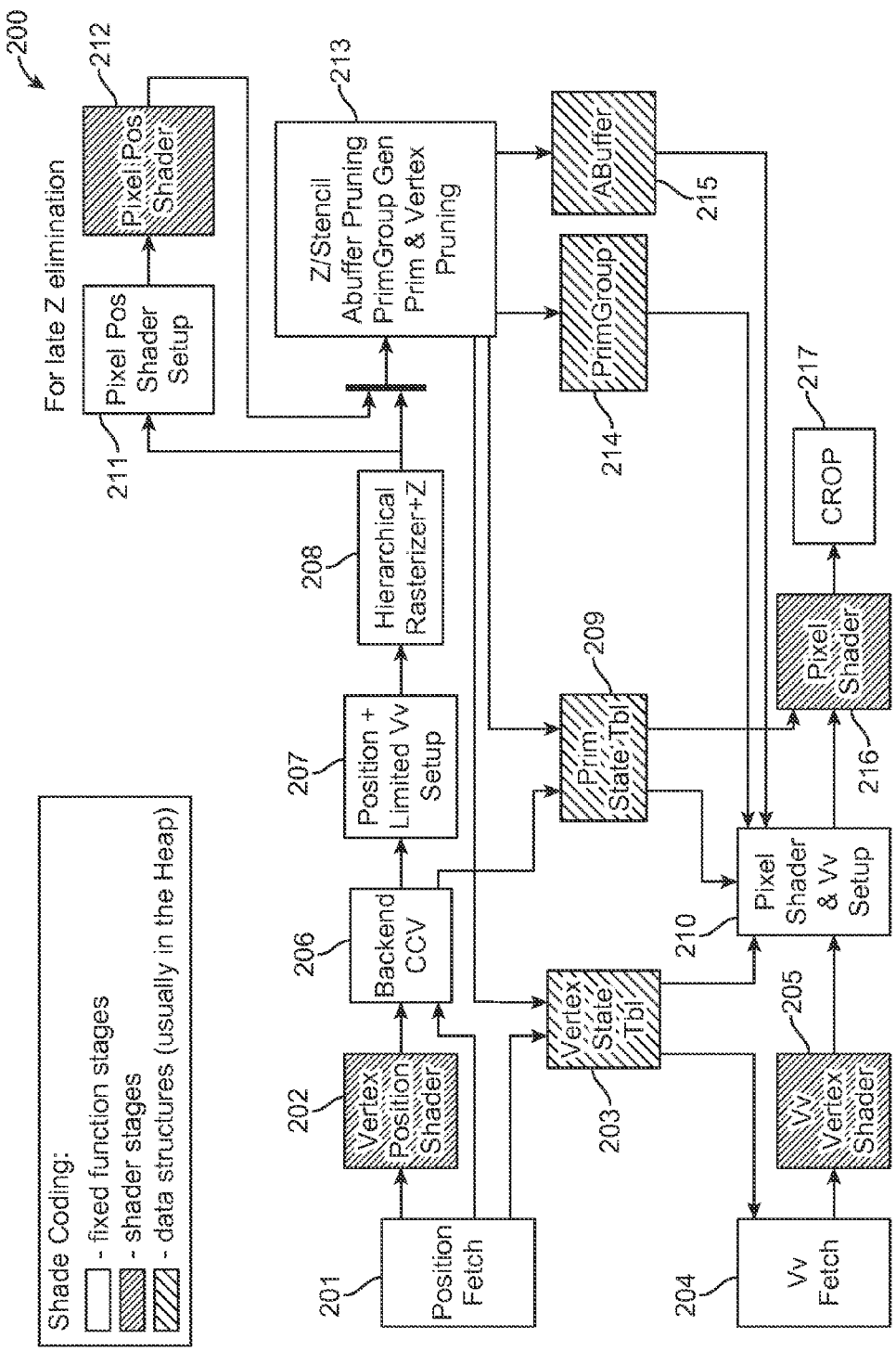
FIG. 3 shows a data flow diagram for graphical processing, according to an embodiment.

FIG. 3 shows a diagram for data flow 200 for graphical processing, according to an embodiment. In one embodiment, the data flow 200 shows how data flows through the pipeline in the GPU module 129 (FIG. 2). It should be noted that data flow 200 is not a physical partitioning of the logic.

In one embodiment, the fixed function stages or units/modules of the data flow 200 comprise position fetch 201, Vv (varying variable) fetch 204, backend CCV 206 (clip, cull and viewport), position plus limited Vv setup 207, hierarchical rasterizer+Z (depth) 208, pixel shader and Vv setup 210, Pixel Coverage Shader setup 211, Z/stencil, ABuffer pruning, primitive group generation, and primitive and vertex pruning in operations unit 213 and coverage raster operation (CROP) 217. In one embodiment, the shader stages or units/modules comprise the Vertex Coverage Shader 202, Color Phase Vertex shader 205, the Pixel Coverage Shader 212 and the pixel shader 216. Shader programs typically run on a pool of processing units that are allocated to different shader programs as needed. In one example embodiment, the data structures (usually in on-chip storage or cached DRAM) may comprise the vertex state table 203, the primitive state table 209, the primitive group (PrimGroup linked list) 214 and the ABuffer 215.

Figure 4:
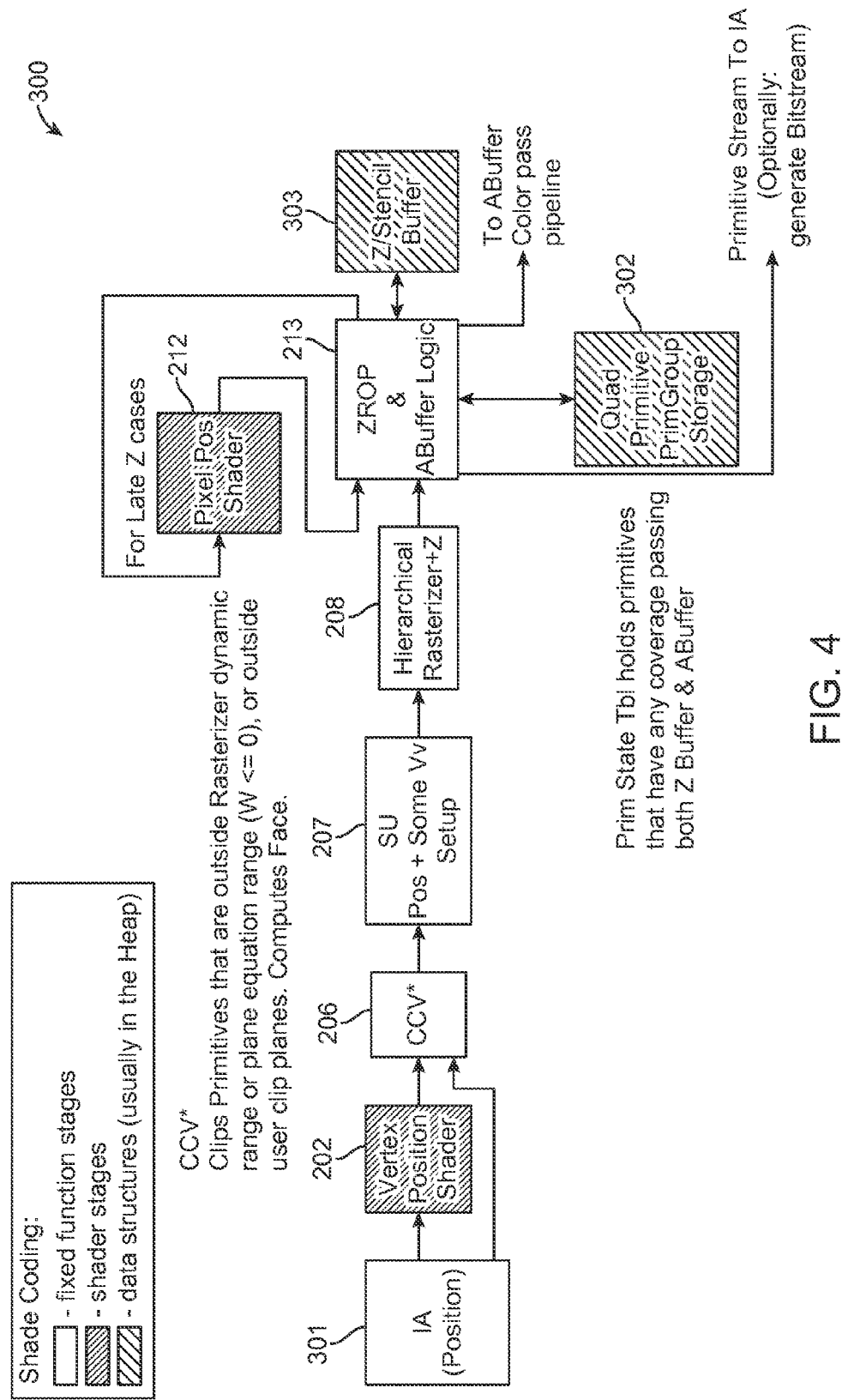
FIG. 4 shows a data flow diagram for coverage rendering processing, according to an embodiment.

FIG. 4 shows a data flow 300 diagram for ABuffer 215 coverage rendering processing, according to an embodiment. In one embodiment, the ABuffer 215 holds surviving coverage and data needed to perform filtering and Color Phase rendering 400 (see FIG. 5). In one embodiment, a tile binning phase is used in the data flow 200 to determine which primitives affect each tile (e.g., tile=set of pixels, such as 32×32, 16×16, etc.) in the image.

In one embodiment, the ABuffer 215 is used for a second step/stage to accumulate and filter final coverage and a third step/stage is used to run the pixel shaders and produce the final image but only access primitives and pixel shaders that have remaining coverage. No retesting of the Z (depth)/Stencil values against buffer 303 data is required.

Figure 5:
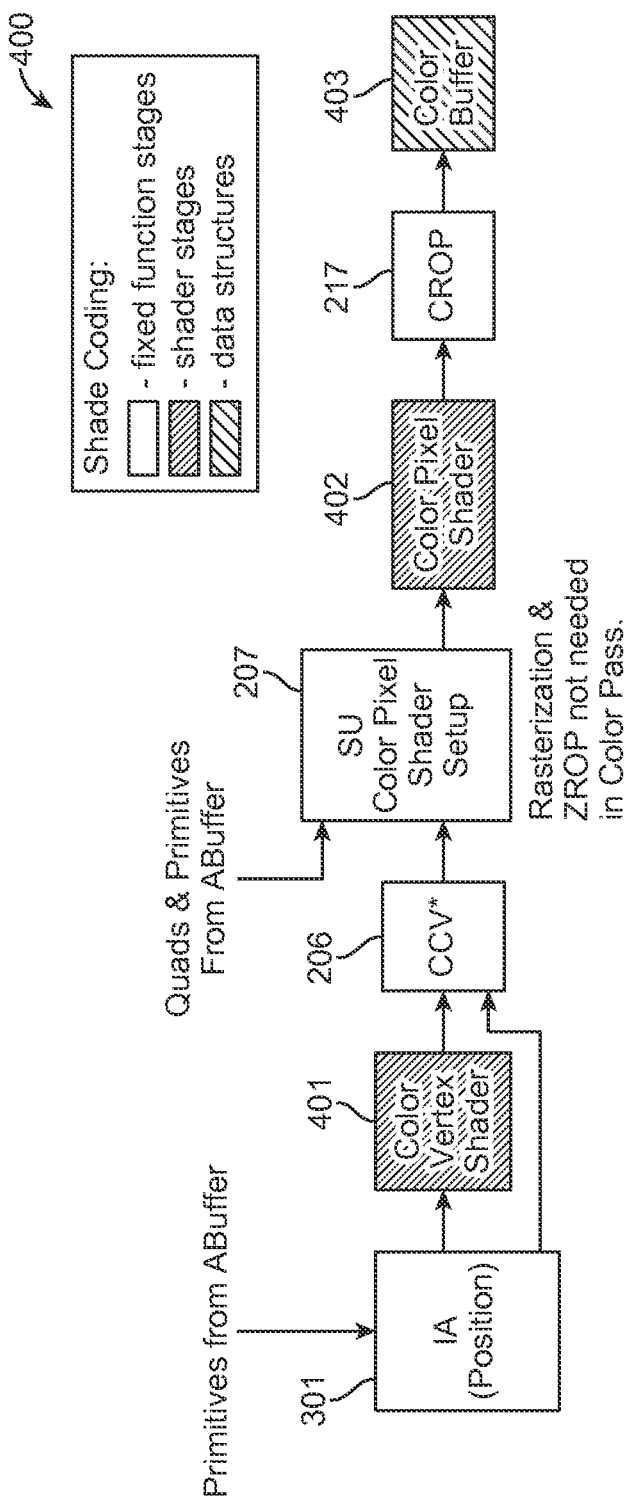
FIG. 5 shows a data flow diagram for color rendering processing, according to an embodiment.

FIG. 5 shows a data flow 400 diagram for color rendering processing, according to an embodiment. In one embodiment, the ABuffer 215 has the following benefits: the ABuffer 215 removes all primitives and vertex shaders from the color rendering phase 400 that do not contribute to the final image, filters all quads and primitives including: late Z cases, Z test disabled cases, read-only Z cases, and translucent cases; correctly computes all Z/Stencil sequences since coverage is retained after the tests: stencil and Z tests are performed in API order and therefore, the final stencil value and set of fragments passing the Z and stencil test is the same as in a conventional graphics pipeline without using one or more embodiments; improves texture performance; reduces color rendering phase 400 attribute fetches; removes hardware stages from the color rendering phase 400: rasterization, early Z, and late Z; reduces GState fetches during the color rendering phase 400; optimizes pixel shader computation by splitting into two shaders: position/coverage/depth shader 212 (for Late Z cases only), color pixel shader 402. In one embodiment, a quad may be defined as an aligned 2×2 group of pixels in (x, y). In one embodiment, an aligned group means that the (x+0,y+0) pixel in a quad is at an even pixel location in (x, y). In one embodiment, pixels in the quad are at: (x+0, y+0), (x+1, y+0), (x+0, y+1), (x+1, y+1) where x and y are even.

In the data flow 200 since GState connects to essentially all pipeline stages, the connections are not shown to make the figure more readable. In one embodiment, the GPU rendering operates in two phases as described below (the ABuffer coverage rendering phase 300 (FIG. 4) and the color rendering phase 400 (FIG. 5)). In one embodiment, two phases are used comprising: the Coverage Phase (top row of blocks in data flow 200) and the Color Phase (bottom row of blocks in data flow 200). In one embodiment, each of the two phases, in general, creates accesses or modifies one or more specific data structures as described below. In one embodiment, the Binning Data Structure is read twice and is used to access vertex attribute data. In one example embodiment, during the first phase, position information is read while during the second phase, varying variable related data is read.

In one embodiment, the position related attributes for the primitives binned to the tile are read and processed by the Coverage Phase in API order. In one embodiment, rectangular blocks of quads, such as aligned 2×2 blocks, 4×4 blocks, etc., may also be rasterized and processed by the ABuffer logic in parallel. In one embodiment, as primitives are rasterized into quads, the quads are tested against the Z/Stencil buffer in the operations unit 213 and then used to filter previous quads that are held in the ABuffer 215. In one embodiment, as quads are filtered out, counters are used to determine which primitives and which vertices actually result in changes to the final image. In one embodiment, the quads held in the ABuffer 215 are used by the Color Phase to generate the final image without rasterizing the primitives a second time. In one embodiment, primitives that survive filtering are placed into groups called PrimGroups. In one embodiment, the Color Phase is run when the all the primitives binned to the tile have been processed in the coverage phase or a data structure fills up.

In one embodiment, the Color Phase shades primitives by PrimGroup rather than by primitive. In one embodiment, the attributes required by the Color Phase for vertices that survive the Coverage Phase filtering are fetched and passed through the Color Phase Vertex shader 205 that converts them into varying variables (Vv). In one embodiment, the vertex Vv values are used to compute plane equations for the primitives in each PrimGroup. In one embodiment, when a PrimGroup is ready, the quads held in the ABuffer 215 for that PrimGroup are used to generate pixel shader threads and Warps. In one embodiment, the pixel shaders (e.g., pixel shader 216 and Pixel Coverage Shader 212) and color buffer updates for a PrimGroup may complete in any order.

In one example embodiment, the binning phase CCV performs full clipping (decomposing partially visible primitives into a set of fully visible primitives) prior to binning the original unclipped primitives but the resulting clipped primitives and vertices are not entered into the Binning Data Structure, but rather the original unclipped primitives and vertices. In one example embodiment, clipping is repeated in the rendering phase, when required, to eliminate the requirement that they be handled specially between binning and rendering. In one embodiment, position is not saved by the binning phase in the Binning Data Structure so the Vertex Coverage Shaders are rerun in the rendering phases. In one embodiment, interpolated W coordinate values are not needed until the Vv values are interpolated in a perspective-correct manner and so W is interpolated with the Vv values even though it is technically position information.

In one example embodiment, it is assumed that the Vertex Coverage Shader 202 position information is frequently (e.g., usually) required to compute the values of the varying variables and so it is stored in the vertex state table 203. In one example embodiment, it is assumed that the original vertex shader position is more expensive (in terms of processing and power consumption) to regenerate than to store after the Vertex Coverage Shader 202 runs. In one example embodiment, the vertex shader position may be rematerialized or stored. In one embodiment, it is assumed that storage is more efficient than processing. In one example embodiment, tessellation and Geometry shaders are not included, but are assumed to be performed in the binning phase with a variation in Binning Data Structure to store the output data for the rendering phase processing. In one example embodiment, early and late Z may be at the usual pipeline stages with a performance penalty when switching between them.

In one embodiment, during the Coverage Phase, the Binning Data Structure is used to fetch position related attributes for vertices for the primitives that have coverage in the current tile. In one example embodiment, if the GState requires late Z functionality, additional attributes that are needed to compute Z, sub-pixel coverage, alpha (for alpha-to-coverage) or pixel kill, as required, are also fetched. In one embodiment, the Vertex Coverage Shader 202 is rerun using the attributes for the vertices required by the current tile. In one embodiment, the Vertex Coverage Shader 202 also computes Vv values required to cover the late Z functionality.

In one embodiment, processed vertices are passed to the CCV 206 that performs full clipping, when required, and viewport transformations. In one embodiment, the CCV 206 also computes the back/front face for each primitive. In one example embodiment, at this stage, primitives should be either trivial accepted or clipped. Trivial reject and culling are already performed in the binning phase processing.

In one embodiment, position plus limited Vv setup 207 operations required for primitive rasterization and hierarchical Z are performed. In one example embodiment, the position plus limited Vv setup 207 includes generating plane equation coefficients for Z, W and any Vv required by the Pixel Coverage Shader 212 if required by the GState. In one embodiment, the primitives are rasterized by a hierarchical rasterizer and also hierarchical Z 208, when allowed by the GState.

In one embodiment, quads that are generated by the rasterization process are tested against the Z buffer and stencil buffer. In one example embodiment, it may be advantageous to also use early read-only Z (RO Z) when the Pixel Coverage Shader 212 is enabled and it is safe to do so because the pixel coverage shader is guaranteed to not generate a depth value that would invalidate the result of this read-only Z test. In one embodiment, passing quads (quads with at least some sample coverage in at least one pixel) are then sent to the PrimGroup generation stage in operations unit 213. In one embodiment, PrimGroup generation in the operations unit 213 collects the coverage for a given primitive and, if there is no overlap with the current PrimGroup, adds it to the current PrimGroup. In one embodiment, if there is overlap, the current PrimGroup is closed and a new PrimGroup is opened. In one embodiment, quads are also added to the ABuffer 215 by the operations unit 213.

In one embodiment, the ABuffer pruning logic of the operations unit 213 removes coverage within quads when an opaque quad is presented to the ABuffer 215. In one embodiment, opaque quads effectively overwrite either opaque or translucent quads in the ABuffer 215. In one embodiment, if a quad is pruned, the quad counter for the primitive that generated it is decremented. In one embodiment, primitives with no coverage are culled. In one embodiment, culled primitives are recorded in the primitive state table (PrimitiveStateTbl) 209. In one embodiment, primitives are culled when they have no quads left. In one embodiment, when a primitive is culled, the primitive counters for the vertices that it references are decremented. In one embodiment, vertices are unused by the following stages if their primitive counters are 0. In one embodiment, a translucent drawing may usually be deferred until after processing of opaque drawings for reducing at least a portion of hardware complexity. In one example embodiment, the translucent operations need not be processed by the coverage pass at all, and related ABuffer storage can be saved/reduced.

In one embodiment, Vertex state is not maintained directly. In one example embodiment, an image input primitive stream number is maintained and is used by the input assembler (IA) 301 unit (FIG. 4) to access vertices for surviving primitives.

In one embodiment, PrimGroup coverage filtering may be performed (after quad pruning is performed if coverage equals zero). In one embodiment, the PrimGroup coverage filtering may be optional and may be skipped if it is too expensive in terms of processing, but will improve flushing efficiency. In one example embodiment, if any data structure fills up, the ABuffer 215 is flushed by passing the PrimGroups and other information to the Color Phase. Since flushing may be performed PrimGroup-by-PrimGroup, flushing may start at any time. If the ABuffer 215 starts to fill up, PrimGroups may be flushed early.

In one embodiment, the Color Phase is started when the ABuffer 215 is flushed. In one embodiment, flushing the ABuffer 215 renders all the PrimGroups remaining in the ABuffer 215 while another embodiment may only flush sufficient PrimGroups to enable the Coverage Phase to continue. In one example embodiment, most processing is managed on a PrimGroup-by-PrimGroup basis. In one embodiment, the Binning Data Structure is used to fetch Vv related attributes for the vertices that define primitives that have coverage in the current tile using Vv fetch 204. In one embodiment, these are used by the tile Color Phase Vertex shader 205 stage. In one embodiment, the VertexStateTbl 203 is scanned to determine which vertices are actually used by this tile. In one embodiment, if the position information is not retained during the Coverage Phase, the required position attributes are re-fetched during the Color Phase.

In one embodiment, the tile Color Phase Vertex shader stage computes the Vv values for the vertices that are required for the current tile using the Color Phase Vertex shader 205. In one embodiment, the resulting Vv values are combined with position information for the various vertices and used to compute the plane equation (Peqn) coefficients for the various primitives required by the current tile. In one embodiment, these coefficients are placed into a Peqn coefficient table. In one embodiment, the PrimitiveStateTbl is updated on a PrimGroup-by-PrimGroup basis. In one embodiment, if the W (usually required by the pixel shader 216) and Z (may be required by the pixel shader 216) plane equation coefficients are not retained, and are recomputed.

In one embodiment, when a PrimGroup is ready, the pixel shader setup stage uses the pixel shader and Vv setup 210 for placing quads from that PrimGroup into Warps for the pixel shader stage to process. In one embodiment, Warps for a given PrimGroup are tracked. In one example embodiment, quads are extracted from the ABuffer 215 for each PrimGroup. Since these are from the same GState, they will access the same textures. In one embodiment, quads are extracted in Z-sort (e.g., Morton) order. In one embodiment, quads from the same PrimGroup at the same tile location will usually access the same texels and are packed sequentially into the Warps, which greatly increases texture access efficiency.

In one embodiment, the pixel shader stage using the pixel shader 216 processes Warps of pixel quads within PrimGroups, and computes the pixel color values and passes them to the Late Z stage. In one embodiment, the late Z stage performs Z and stencil compares on the pixels within the PrimGroups passed to it if late Z is enabled for the GState. In one embodiment, when pixels within quads within PrimGroups pass the late Z tests, they are passed to the CROP 217 stage for the final color processing. In one embodiment, the CROP 217 processes pixels within quads that are passed to it. In one embodiment, any required alpha blending is performed prior to writing colors to the color buffer 403 (FIG. 5).

In one embodiment, a Binning Data Structure position fetch phase uses the IA 301 unit (FIG. 4) position fetch 201 as a fixed-function processing stage that reads the Binning Data Structure data structure and fetches position information for Coverage Phase processing. In one embodiment, the data is fetched for one tile at a time. In one example embodiment, the position fetch 201 also fetches the GState information required to process each tile. In one example embodiment, the position fetch 201 creates entries in the VertexStateTbl 203 and the PrimitiveStateTbl 209. In one example embodiment, position fetch 201 only fetches attributes required for the Coverage Phase operation. In one example embodiment, if late Z is required, additional attributes may be required to generate a limited set of Vv values for the Pixel Coverage Shader 212.

In one embodiment, vertex attributes and GState that are required to compute the Vv values are fetched using the IA 301 unit's (FIG. 4) Vv fetch 204 unit from the original attribute arrays in DRAM. In one embodiment, only attributes for required vertices are fetched. In one example embodiment, vertices that have been culled are skipped. In one embodiment, the fetched attributes are placed into Warps for the tile Color Phase Vertex shader 205.

In one embodiment, the CCV 206 unit provides for vertices to be passed from the Vertex Coverage Shader 202 to the PrimitiveStateTbl 209 and the CCV unit that performs full clipping, when required, and viewport transformations. In one embodiment, at this stage, primitives should be either trivial accepted or need to be clipped. In one embodiment, culling was already performed in the binning phase processing. In one example embodiment, full primitive clipping, which is rare, is repeated by the rendering phase when required to avoid complexity in the Binning Data Structure and other logic. In one embodiment, since rendering is limited by the rasterization stage to the tile region only, full clipping is only required for a primitive when one or more vertices falls under one or more of these conditions: if W is very small or negative (negative should be an application error), if position (X, Y) extend outside the dynamic range of the rasterization or setup computation logic, or vertices are behind the eye point. In one embodiment, full clipping results in new vertices and primitives which are added into the VertexStateTbl 203 and PrimitiveStateTbl 209 by the CCV stage using the CCV 206. In one embodiment, the CCV 206 computes the Backface/Frontface state of primitives and enters it into the PrimitiveStateTbl 209.

In one embodiment, position setup using the position plus limited Vv setup 207 unit performs primitive setup for rasterization. In one example embodiment, position includes (X, Y, Z, W). In one embodiment, the plane equation coefficients for Z and W are computed. In one embodiment, W is only required if the Pixel Coverage Shader 212 is required.

In one embodiment, if the Pixel Coverage Shader 212 is included for late Z optimization, the Pixel Coverage Shader setup 211 is used for performing the required Pixel Coverage Shader setup. In one embodiment, the pixel position setup 211 unit needs to generate plane equations for the required attributes (unless this is done in the position setup stage using the position plus limited Vv setup 207 unit) and prepare Warps for execution. In one embodiment, the same hardware that computes position setup (Z, W) plane equations may be used to compute Color Phase setup computations.

Figure 6:
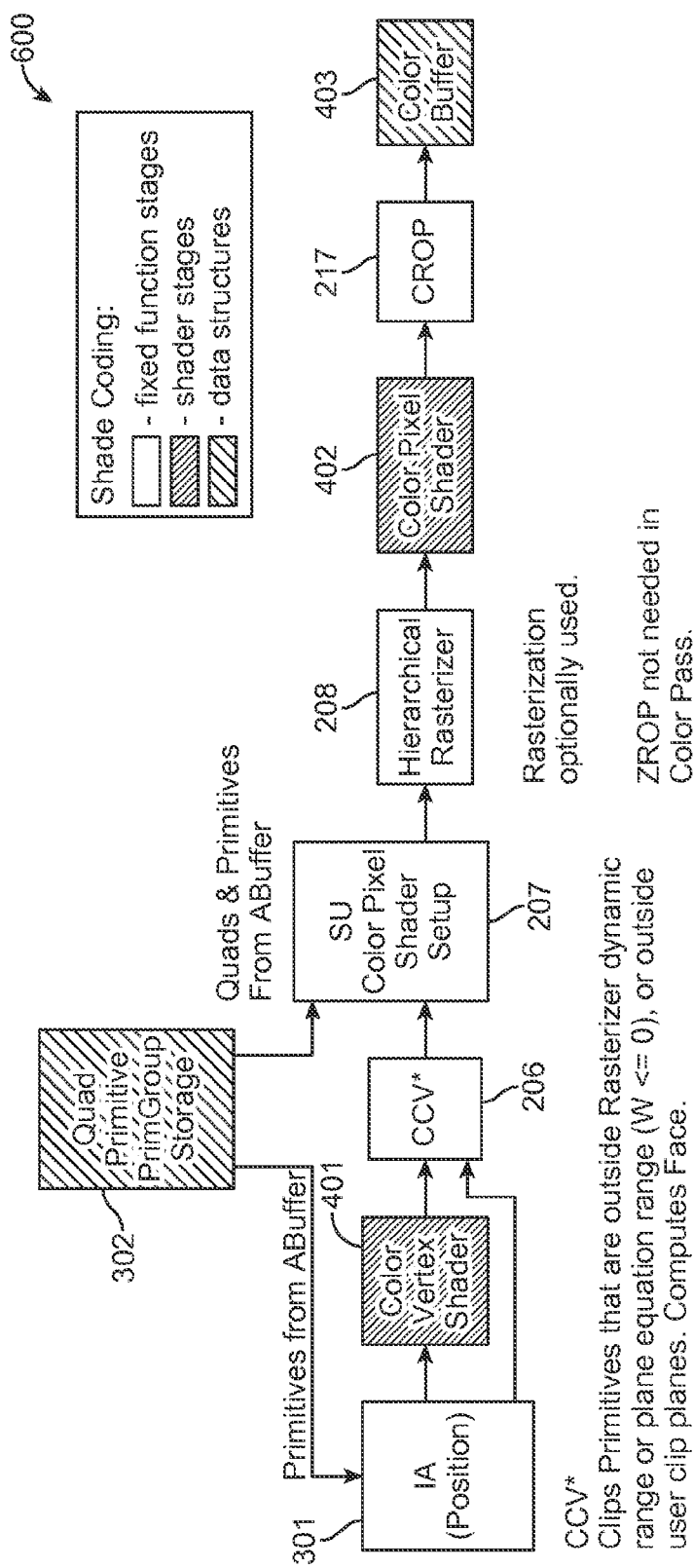
FIG. 6 shows a data flow diagram for rasterization color processing, according to an embodiment.

FIG. 6 shows a data flow diagram 600 for color processing by re-rasterizing primitives, according to an embodiment. In one embodiment, hierarchical rasterization processing is performed by the hierarchical rasterizer plus Z 208 unit to rasterize primitives. In one embodiment, when GState allows, hierarchical Z buffering is also applied in the rasterizer plus Z 208 unit. In one embodiment, Z values are required and are interpolated internally. In one example embodiment, the output of the rasterizer plus Z 208 unit is a set of quad structures that include the following: upper left corner integer (X, Y) location within the tile (e.g., 5-8 bits each), per-pixel coverage masks (e.g., 1 to 16 bits×4), 4×FP32-Z values for each pixel within the quad, and PrimSTID. In one embodiment, coverage masks are Boolean structures that specify which pixels or samples within a quad are "covered" by a primitive and will be modified by the primitive.

In one embodiment, essentially all operations performed by the operations unit 213 are performed on a quad-by-quad basis except for the control of PrimGroup generation. In one embodiment, most functions of the operations unit 213 logic may be readily partitioned and parallelized. In one example embodiment, most functions may be divided by position group, such as even/odd quad horizontally or vertically, where specific quad locations in the tile are associated assigned to particular position groups. In one embodiment, some logic may need to be centralized or coalesced, but many operations of the operations unit 213 may be parallelized, such as: PrimGroup generation, except that compares can be distributed, PrimSTID quad counters & operations and VertexID primitive counters & operations.

In one embodiment, Z/Stencil operations are performed by the operations unit 213. In one embodiment, early and late Z share the same Z raster operations (ZROP) stage. In one embodiment, late Z is implemented by using a special position/coverage/kill pixel shader 212 to compute these parameters before Z/Stencil operations are performed by the operations unit 213. In one embodiment, the pixel shader 212 is selected on a GState-by-GState basis. In one embodiment, depth and stencil related tests are both required, and transparency requires special handling.

In one embodiment, ABuffer pruning (or filtering) is performed by the operations unit 213 after early Z (depth and stencil tests). In one embodiment, pruning is performed on a quad-by-quad basis. In one embodiment, in the ABuffer pruning operations performed by the operations unit 213, opaque samples prune any obscured sample (depth/stencil tests pass): when a sample in a quad is covered by an opaque sample, it is pruned; when a quad has no more visible samples, the quad is pruned; when a primitive has no more unobscured quads, the primitive is pruned; and when a vertex has no more primitives, the vertex is pruned.

In one embodiment, transparent samples do not prune anything but are ordered by API order (PrimGroup) and are pruned by subsequent opaque samples. In one example embodiment, when all quads for a given PrimGroup are removed from a set, set coverage is removed from the PrimGroup quad mask. In one embodiment, because ABuffer 215 entries are held in sets, these sets may be parallelized and processed very efficiently. In one embodiment, the data for each data field in a set is packed together in memory so one read returns all of the data for one data field of the set. In one example embodiment, the GroupID for a given quad set may be packed into a single memory word.

In one embodiment, the filtering and accessing processes performed by the operations unit 213 may be parallelized efficiently as well by associating data with set locations. In one embodiment, the vertex "PrimitiveCount" and primitive "QuadCount" counters are physically located in or near the ABuffer filtering logic of the operations unit 213 (since these counters are accessed most often by the filtering process).

In one example embodiment, the pseudo-code or process for filtering by the operations unit 213 for each input quad at quad location in tile (cellset) comprises:

```
// ABuffer linked
list cell structure
   typedef struct   tagABufferCell      {
      unsigned int         PrimGroup ;
      size_t               PrimEntry ;
      uint64_t             Cover ;
      unsigned int         Next ;
      unsigned int         Cells ;         // Not in HW - for
statistics
   } ABufferCell ;
   void   ABuffer::filterQuad( unsigned int inPrimGroupID,
unsigned int primEntry,
         unsigned int inQuadPosition, ABQuad * ppInQuad,
bool inTranslucent ) {
      unsigned int    previous    = inQuadPosition;
      unsigned int    current     = inQuadPosition;
      bool            done        = false;
      bool            saved       = false;
      // aBCellArray[ ] is an array of ABufferCell cells that
define quads in the array and
      // hold them in linked lists
      if ( ppInQuad->Cover == 0 ) { return false; };          //
Discard quads with null coverage
         addQuadToFillPrim( ppInQuad, inQuadPosition );    //
update primitive quad counter & coverage mask
      // Translucent - Append to end of list, no filtering
      if ( inTranslucent ) {
         appendCell( inPrimGroupID, primEntry,
inQuadPosition, ppInQuad->Cover ); // Add cell to end of
list
         return;
      }
      // Opaque filtering
      while ( !done ) {
         unsigned int next   = aBCellArray[current].Next;
         // Is there any overlap with this cell in the
list
         aBCellArray[current].Cover  &= ~inCover;       //
Filter cell coverage
         if ( aBCellArray[current].Cover == 0 ) {         // No
coverage survives
            // update primitive quad counter & coverage
mask
            filterPrim( aBCellArray[current].PrimEntry,
inQuadPosition );
            if ( saved )   {   // Free "current" cell
(cannot be 1st element in list)
               // Unlink cell and return it to free list
               unlinkABCell(current, previous);    // list
unlink function
            } else {
               // Overwrite current cell contents
                           // No changes to links, but step to
next cell to continue filtering
               populateABufferCell( inPrimGroupID,
primEntry, current, inCover, next );
               saved          = true;
               previous       = current;
            }
         } // If coverage survives - go to next cell in list
         // End loop if end of list
         done           = (next == AB_ENDELEMENT);
```

```
         // Use specific entry number to define end of list
            current          = next;
      }
      if ( !saved ) {
         // If not saved, append to end of list:
         // allocate, populate & link into list
         appendCell( inPrimGroupID, primEntry, inQuadPosition,
inCover ); // Add cell to end of list
      }
      return;
   }
```

In one embodiment, primitive group (PrimGroup) generation is performed by the operations unit 213 where primitive groups are used in the rendering phase operations to simplify control and enable Color Phase rendering with good performance and with less processing required. In one embodiment, PrimGroups are defined by a set of primitives and a coverage mask. In one embodiment, primitive groups include primitives with the following characteristics: same GState; no primitive overlap; sequential primitives in tile after tile binning (may not be sequentially adjacent from API perspective); and it is desirable to be able to configure a maximum PrimGroup size for efficiency (plane equation coefficient management).

In one embodiment, pixels and pixel shader Warps within a PrimGroup may complete out-of-order. In one embodiment, resources used by a PrimGroup, such as plane equation coefficients, are managed and reclaimed as a set. In one embodiment, a PrimGroup is generated using a tile-sized PrimGroup mask which holds one (1) bit per sample within the PrimGroup.

In one embodiment, each time a new primitive is rasterized, the coverage from the rasterized quads from that primitive are combined to generate a new (tile-sized) sample mask. In one embodiment, each quad is compared with the existing PrimGroup mask. In one embodiment, if there is any overlap between the quad mask and the existing PrimGroup mask, the existing PrimGroup is closed and a new PrimGroup is created from the new primitive mask by the operations unit 213. PrimGroup generation may be performed either before or after Early Z, but before the ABuffer processes by the operations unit 213. In one embodiment, PrimGroup generation after Early Z is preferred.

In one embodiment, the ABuffer 215 is flushed by the operations unit 213 when the Coverage Phase of the tile is completed or when data structures become full. In one embodiment, flushing the ABuffer 215 is performed on each PrimGroup in API order. In one embodiment, any PrimGroup that does not have any remaining coverage is eliminated. In one embodiment, flushing within a given PrimGroup may occur in any order since there is no overlap within a PrimGroup. In one embodiment, pixel shaders (e.g., pixel shader 216) cannot be set up until the flush process comprises the following high-level operations to be performed for each PrimGroup with coverage remaining: read attributes for required vertices: make a list of primitives that still have coverage for each PrimGroup, generate vertex indices for the input assembler (IA) 301 unit (FIG. 4) to fetch the required vertices for the primitives; perform pixel shader setup operations by the pixel shader setup 210 unit for quads with coverage remaining after filtering: synchronize with output of vertex shaders (e.g., Color Phase Vertex shader 205, and Vertex Coverage Shader 202) for each PrimGroup: scan ABuffer 215 structure and generate list of quads to be rendered in this PrimGroup by the operations unit 213, and provide quad data access to pixel shader setup 210 unit in PrimGroup Order. In one embodiment, the pixel shader setup 210 unit will need to read quad information from the ABuffer 215 for each quad it processes.

In one embodiment, a vertex tracking process uses the vertex state tables 203 to keep track of which vertices are used by primitives with at least some coverage remaining. In one embodiment, when flushing is required, these vertices are fetched in API order. In one embodiment, the vertex tracking process has the following attributes: the process is intuitive, and there is no need to re-access and filter Binning Data Structure for the Color Phase. In one embodiment, vertex tracking requires the vertex state table 203 data structure, which may be large and, may become very large with use of big tile sizes (e.g. 128×128). In one embodiment, the vertex tracking process requires filtering vertices when primitives no longer have coverage.

In one embodiment, Color Phase attribute fetch requires the IA 301 unit to read the original Binning Data Structure and tests each primitive in the original Binning Data Structure for coverage. In one embodiment, if the primitive has coverage, the IA 301 unit generates or reads the indices for that primitive and adds them to a list for a given PrimGroup. In one embodiment, the attribute fetch process has the following attributes: no need for vertex state table 203 structure, filtering or storage, and no added storage for primitive links to the vertex structure.

In one embodiment, the attribute fetch process needs to re-access Binning Data Structure for the Color Phase, and needs to filter each primitive in the Binning Data Structure to test for remaining coverage. In one embodiment, covered primitive determination may be complex, slow and may limit performance—which may require added data in the primitive state table 209 to support this.

In one embodiment, a primitive linking process tracks the primitives that are still alive (i.e., still have some coverage) in each PrimGroup. In one embodiment, a linked list of primitives is retained for each PrimGroup. In one embodiment, the links may be retained in the primitive state table 209 or separate from it. In one embodiment, for the Color Phase, the primitive linking process does not require re-accessing and filtering the Binning Data Structure. In one embodiment, the vertex state table 203 structure does not need to be used for the primitive linking process.

In one embodiment, added storage for primitive links is required; bidirectional links may be useful to efficiently unlink primitives when there is no more coverage but unlinking should not occur at a high rate, so unidirectional links should be sufficient. In one embodiment, primitive linking requires unlinking primitives from the list when a primitive no longer has coverage. In one embodiment, primitive linking may require allocating and freeing primitive state table 209 entries to conserve space.

In one embodiment, pixel shader setup is performed by the pixel shader setup and Vv setup 210 unit on each PrimGroup at a time. In one embodiment, when pixel shader setup processing on a PrimGroup is completed, active pixel shader Warps for the PrimGroup may be run, which includes Vv setup and generating Warps of active quads by the pixel shader setup and Vv setup 210 unit. In one embodiment, primitive clipping is repeated for primitives that require it. In one example embodiment, vertices created by clipping in the Coverage Phase may be saved and recalled since this is rare.

In one embodiment, if position attributes or clip coordinate position values are not saved in the Coverage Phase, position attributes need to be re-fetched and position needs to be recomputed since the setup unit requires position information for the vertices.

In one embodiment, a re-rasterize approach is used for performing the following: pass primitives through CCV 206 again if necessary (which may be bypassed); rasterize primitives again using the hierarchical rasterizer plus Z 208 unit if they have at least one (1) sample covered after pruning; and test samples (quads) to see if there is coverage in the ABuffer 215 and enter into pixel shader Warp.

In one embodiment, for each PrimGroup, the Coverage Phase computes a conservative quad coverage mask. In one embodiment, one bit is required per quad location within the tile. In one embodiment, if any primitive in the PrimGroup has some coverage within a given quad location, the bit associated with that quad location is set. In one example embodiment, the mask may be filtered during ABuffer filtering by the operations unit 213 to reduce ABuffer 215 accesses during this phase.

In one example embodiment, for a 32×32 pixel tile example: a PrimGroup coverage mask requires 16×16 quads per tile. In one example embodiment, conservative PrimGroup coverage is encoded into 2 bytes per span of tiles or 32B/PrimGroup. In one embodiment, optimizations such as run-length encoding may be possible. In one embodiment, if up to 128 PrimGroups are supported without encoding or compression, 4 KB of RAM may be required and 256 PrimGroups may require 8 KB. In one embodiment, 64×64 tiles may require ~4× storage per PrimGroup.

In one embodiment, the Color Phase checks for PrimGroup coverage of ABuffer 215 quad locations as follows. In one embodiment, all primitives in a PrimGroup use the same GState so quads in PrimGroup may be packed together into Warps in any order. In one embodiment, re-rasterization is not required since all coverage is retained in the ABuffer 215. In one embodiment, since plane equations are managed by PrimGroup, the plane equations will all be retired when the Warps for the PrimGroup are completed. In one embodiment, per-PrimGroup Warp counts are maintained. In one embodiment, no sorting is needed since the quads for primitives in a PrimGroup may be rendered in any order. In one embodiment, the cell-sets are scanned within the tile in Z scanning (not depth) order to improve texture cache efficiency.

In one embodiment, all quads at a given set location are packed into the Warps together which greatly enhances texture cache efficiency. In one embodiment, primitive quads are erased from the ABuffer 215 when they are consumed to generate the pixel shader 216 entries in the currently flushed PrimGroup Warp. In one embodiment, the erased quads will be used for subsequent PrimGroups.

In one embodiment, at each quad location, a walk-through of the quads for the PrimGroup is performed since the order in the ABuffer 215 will not be according to PrimGroup. In one embodiment, when a quad is processed and removed because it is in the PrimGroup, if the next quad is in the same PrimGroup, the next quad is processed (it will not overlap but may have partial quad coverage). In one example embodiment, if the PrimGroup identifier for the quad structure is held in a dedicated RAM buffer, this may be scanned by hardware components quickly. In one embodiment, when all quads that have coverage are processed, processing proceeds to the next PrimGroup.

In one embodiment, Vv setup performed by the pixel shader and Vv setup 210 unit includes computing plane equations for primitives. In one embodiment, these computations are performed on the active Vv values of primitives that have active quads. In one embodiment, the computations performed by the pixel shader and Vv setup 210 unit are computed PrimGroup by PrimGroup, so the total number of coefficients required is greatly reduced. In one embodiment, if primitives have been clipped, the vertex Vv values from clipping-generated vertices need to be computed. In one embodiment, the computation may be performed by repeating the clipping computations or by using barycentric parameters from the original clipping operation to compute the clipped Vv values. In one example embodiment, three barycentric values may be required for each new vertex.

In one embodiment, pixel shader 216 data structures are managed by PrimGroup. In one embodiment, a reference counter is provided for each PrimGroup that has Warps in the pixel shader stage. In one embodiment, when a Warp is allocated for this PrimGroup, the counter is incremented. In one embodiment, when a Warp completes for this PrimGroup, the counter is decremented. In one embodiment, when the counter goes to 0, the PrimGroup flush is complete and all allocated resources may be reclaimed.

In one embodiment, late Z uses the ZROP stage (operations unit 213, FIG. 4) after the execution of the pixel shader stage. In one embodiment, late Z may cull pixels and quads. In one embodiment, late Z is used when the early Z operation cannot be enabled (for example, when the Pixel Coverage Shader 212 modifies Z). In one embodiment, since Z processing needs to be handled consistently, late Z actually may use the same storage and hardware as early Z. In one embodiment, switching between early Z and late Z requires synchronization and sometimes allowing the pipeline between them to drain (switching from late Z to early Z). In one embodiment, late Z is unnecessary if the Pixel Coverage Shader 212 is implemented in the architecture.

In one embodiment, the Vertex Coverage Shader 202 regenerates the post-vertex shader position information required by later stages. In one embodiment, the Pixel Coverage Shader 212 may be an optional stage that may be implemented to handle late Z processing with the early Z unit. In one embodiment, it computes pixel shader 216 modified Z (depth) and coverage. In one embodiment, alternatively to computing modified depth, pixel shader 216 may compute pixel kill, coverage-to-alpha computation, depth, etc.

In one embodiment, the Color Phase Vertex shader 205 computes the vertex values of the varying variables. In one embodiment, the Color Phase Vertex shader 205 requires access to the pre-CCV position information of the vertices. In one embodiment, the outputs are used by the Vv setup pipeline stage. In one example embodiment, the position information may be recomputed in this stage if it is determined that the position is not often used during this stage.

In one embodiment, the pixel shader 216 is the final pixel shader that generates the final (pre-blending) color values for the CROP 217.

In one embodiment, there are three early/late Z cases: early Z (default); late Z/early read-only Z (RO Z); and late Z/No RO Z. In one embodiment, early Z is the default case. In one embodiment, late Z is generally required when the pixel shader 216 writes Z values, performs pixel kill or modifies coverage. In one embodiment, the pixel shader 216 may declare the depth output as one of the following (in OpenGL): depth_any; depth_greater; depth_less; and depth_unchanged. In one embodiment, given one of these declarations and the depth (Z) compare function, early Z or early RO Z may be selected even if the pixel shader 216 modifies Z. In one embodiment, the pipeline avoids late Z in the Color Phase by executing a position/coverage/kill pixel shader (e.g., Pixel Coverage Shader 212) between rasterization and the Z buffer access.

In one embodiment, a PeqTbl comprises a master plane equation coefficient table for rendering. In one embodiment, a PrimSTID comprises a primitive table entry number that is used for plane equation management and synchronization.

In one embodiment, screen sub-tile (SST)=subset of an ST that fits in a limited size (e.g. 4 KB or 8 KB) space. In one example embodiment, if we have 4xMSAA and our output format is high dynamic range (HDR) (8B/sample), 4 KB=512 samples, 128 pixels. So, an SST, for example may be 16×8 or 8×16 pixels. In one embodiment, a PrimGroup=subset of an SST such that there are no overlapping primitives in the SST (=>a PrimGroup forms an eve, potentially discontinuous surface). In one embodiment, an SST may be organized into a linked list of API-ordered PrimGroups. In one embodiment, each PrimGroup may correspond to a WARP. In one embodiment, Warps are launched in API order inside an SST (though there is no requirement to order PrimGroups inter-SST). In one embodiment, it is necessary to blend (in ZROP (operations unit 213, FIG. 4) and CROP 217, FIG. 5) completed PrimGroups in API order (at least with respect to one SST).

In one embodiment, the base data structures for the rendering phase pipeline processing may comprise Pre-Shader Quad (PreQuad), Post-Shader Quad (PostQuad), Pixel Coverage Mask (PCM), Sample Coverage Mask (SCM), Primitive Pixel Coverage Mask (PPCM), Quad Coverage Mask (QCM), PrimGroup Coverage Mask (GCM), Tile Fetch Mask (TFM), PrimGroup Fetch Mask (LFM), Primitive PrimGroups, PrimGroup PrimitiveStateTbl (LPrims), and PrimGroup Tile Fetch Mask (LTFM), etc.

In one embodiment, the PreQuad is the structure of a rasterizer output quad. In one embodiment, the rasterizer output quads are always held in structures that associate it with a particular screen tile. In one embodiment, the PreQuad comprises the following information listed in Table 1:

TABLE 1

| Contents | Bits | Description |
| --- | --- | --- |
| PrimSTID | 9 | Primitive ID |
| X | 6 | X location in the current tile |
| Y | 6 | Y location in the current tile |
| Z[4] | 32 * 4 | FP32 depth values for each pixel within the quad |
| Mask | 4 | Which pixels have any coverage, used when no MSAA and for initial Zombie state |
| Coverage | 16 * 4 | Coverage vectors for pixels in quad (optional, depending on MSAA mode) |
| Total | 25-89 | Bits per quad (32-96 in memory) |

In one embodiment, for PreQuads, coverage is only required when MSAA mode is greater than 1X. In one embodiment, mask is a conservative version of coverage but is different for operation with MSAA greater than 1X than for MSAA 1X operation, which is due to MSAA and aliased sampling rules.

In one embodiment, the PostQuad is the structure of a pixel shader 216 output quad. In one embodiment, the PostQuads are always held in structures that associate it with a particular screen tile. In one embodiment, the size is a function of the number of render targets configured (RTn, below). In one embodiment, it is also a function of the pixel shader 216 output color depth (PBits=16 or 32 bits). In one embodiment, the PostQuad comprises the information shown in Table 2.

TABLE 2

| Contents | Bits | Description |
| --- | --- | --- |
| X | 6 | X location in the current tile |
| Y | 6 | Y location in the current tile |
| Color[RTn] | RTn * PBits * 4 | Pixel shader output color components |
| Z[4] | 32 * 4 | FP32 depth values for each pixel within the quad (only required for late Z) |
| Mask | 4 | Which pixels have any coverage, used when no MSAA and for initial Zombie state |
| Coverage | 4 t-64 | Coverage vectors for pixels in quad |
| Total | 25-89 | Bits per quad (32-96 in memory) |

In one embodiment, for PostQuads, coverage is only required when MSAA mode is greater than 1X. In one embodiment, mask is a conservative version of coverage but is different for operation with MSAA greater than 1X than for MSAA 1X operation, which is due to MSAA and aliased sampling rules.

In one embodiment, the PCM holds tile coverage information to the resolution of a pixel. In one embodiment, the size is: PCMSize=(Tile width in pixels*tile height in pixels/8) bytes. In one example embodiment, for a 64×64 pixel tile, this is 512B; for a 32×32 pixel tile, this is 128B. In one embodiment, it is conservative in that any coverage within the pixel results in the quad being marked as covered.

In one embodiment, when MSAA modes are enabled, the SCM mask contains 1 bit for each sample within each pixel. In one embodiment, the SCM holds tile coverage information to the resolution of a sample. In one example embodiment, the size of an SCM is: SCMSize=((Tile width in pixels*tile height in pixels/8)*Samples) bytes; for a 64×64 pixel tile with 8X MSAA, this is 4 KB; and for a 32×32 pixel tile with 4X MSAA, this is 512B. In one embodiment, it is conservative in that any coverage within the pixel results in the quad being marked as covered. In one embodiment, when MSAA modes are enabled, the SCM mask contains 1 bit for each sample within each pixel.

In one embodiment, the PPCM is a PCM for a primitive.

In one embodiment, the QCM holds tile coverage information to the resolution of a quad. In one embodiment, the size for the QCM is: QCMSize=PCMSize/4; for a 64×64 pixel tile, this is 128B; and for a 32×32 pixel tile, this is 32B. In one embodiment, the QCM is created from a PCM. In one embodiment, it is conservative in that any coverage within the quad results in the quad being marked as covered.

In one embodiment, a GCM holds coverage information for a PrimGroup. In one embodiment, since the PrimGroup may cover up to the entire tile, this mask is an instance of a PCM. In one embodiment, when MSAA is enabled, this mask is an instance of an SCM.

In one embodiment, the TFM is a structure that holds the memory block coverage, in memory fetch size blocks, of a tile. In one embodiment, the TFM mask holds coverage information to the resolution of a memory fetch block (e.g. 32B or 64B). In one embodiment, since 1 bit is allocated for each memory block in an entire tile, this mask contains a per-memory fetch bit-mask of the tile. In one embodiment, the size of a TFM is: TFMSize=((Tile area in pixels*Bytes per pixel)/(Bytes per memory fetch block)/8) bytes; for a 64×64 pixel tile with 1B/pixels and 64B fetches, this is 8B; and for a 32×32 pixel tile with 4B/pixels and 32B fetches, this is 16B. In one embodiment, another way of looking at this is that the TFM is set by the maximum tile buffer size in bytes and the size of the memory fetches (e.g., 64B). In one embodiment, if sub-screen tiles are used, the sub-screen tile buffer size is used instead of the tile buffer size. In one embodiment, if MSAA is enabled, the mask scales according to the size of pixels including all stored samples.

In one embodiment, the TFM's that are used by the ROP are created from LFM's. In one embodiment, all LFMs that access a given tile are "OR'ed" to determine which memory block needs to be fetched from DRAM. In one embodiment, whenever a new LFM is created, it is passed to the ROP. In one embodiment, when the tile associated with the LFM is loaded from DRAM, the LFM is compared with the current ROP TFM for the tile and used to fetch data that is not yet resident. In one embodiment, the final ROP TFM is also used to control what data is written back to DRAM when the time is swapped out.

Figure 7:
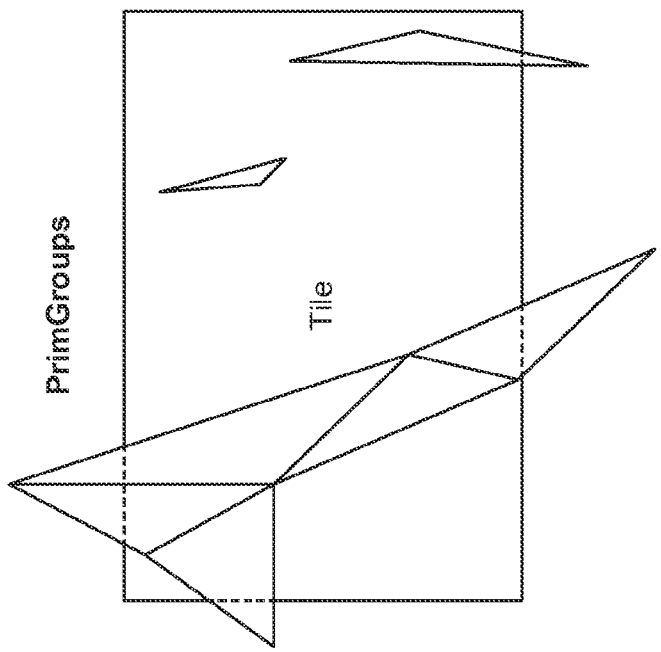
FIG. 7 shows a primitive grouping example, according to an embodiment.

FIG. 7 shows a PrimGroup 700 example, according to an embodiment. In one example embodiment, sample coverage is used for PrimGroups though quad coverage may also be used. In one embodiment, Quad coverage will result in more PrimGroups, which will reduce efficiency. In one embodiment, PrimGroups are created by accumulating sample coverage from sequential primitives within a tile that do not overlap each other. In one embodiment, PrimGroups reference the same GState. In one embodiment, quad coverage is used after a PrimGroup has been created and closed so that no more primitives may be added to it.

In one embodiment, as each primitive is rasterized, the rasterizer (e.g., hierarchical rasterizer plus Z 208) creates a PCM for it. In one embodiment, PrimGroups are created at the rasterizer output. In one embodiment, the rasterizer output PCM is compared with the current GCM. In one embodiment, if there is no overlap, the primitive is included in the current PrimGroup and the PCM is "OR'ed" with current GCM and the next primitive is examined. In one embodiment, when a primitive in a tile covers one or more pixels that are already covered in the GCM, the GCM is closed and a new one started.

In one embodiment, since rendering within a PrimGroup contains no primitive overlap, quads from primitives in a PrimGroup may be rendered in any order in the pixel shaders, ZROP (in operations unit 213, FIG. 4) and CROP 217 (FIG. 5). In one embodiment, since there may be overlap between PrimGroups, PrimGroups need to be rendered in-order. In one embodiment, PrimGroups may be used for certain control purposes, such as determining when plane equation coefficients may be reclaimed or when pixel shader warp outputs may be passed to the Late Z and/or CROP.

In one embodiment, PrimGroups have the following characteristics: PrimGroups are rendered in API order; same Gstate: same shader code; and same textures; all rendering may be out-of-order: all quads can be packed into Warps in arbitrary manner; tile coverage traversed in Z-order (Morton order): texture accesses very efficient; and resources managed as a group: e.g., plane equation coefficients; and eases management of circular buffers.

In one example embodiment, the PrimGroup descriptors are held in a different table than the Primitive Descriptors. In one example embodiment, only one PrimitiveStateTbl is employed. The PrimitiveStateTbl holds the primitive descriptors. Primitive descriptors have a link to the next primitive in the PrimGroup, forming a linked list. In one example embodiment, the PrimGroup holds a pointer to the first primitive in the list for that PrimGroup. In one embodiment, PrimGroup PrimitiveStateTbl includes the primitive ID's within a PrimGroup. In one embodiment, primitives in a PrimGroup are sequential. In one embodiment, the PrimGroup structure contains a reference counter that contains the number of Warps in the PrimGroup that have not yet been passed to the ROP. In one embodiment, the PrimGroup Tile Fetch Mask (LTFM) is a TFM that contains the memory fetch information associated with a PrimGroup.

Figure 8:
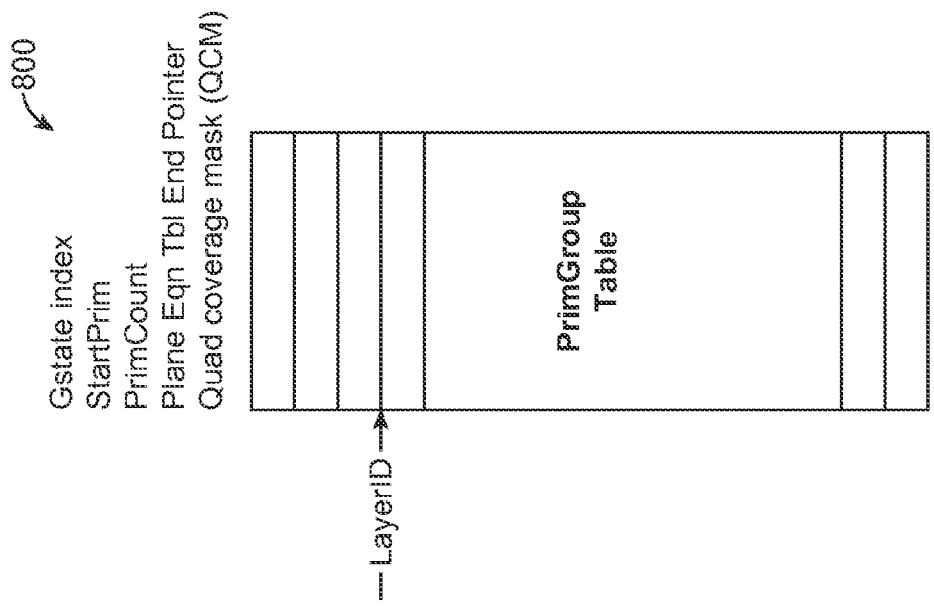
FIG. 8 shows an example primitive group table structure, according to an embodiment.

FIG. 8 shows an example primitive group table (PrimGroup Table) structure 800, according to an embodiment. In one embodiment, the PrimGroup Table holds the state of the current set of PrimGroups in a circular buffer stored in table form. In one embodiment, the PrimGroups are accessed by an index (GroupID). In one embodiment, each PrimGroup has a set of states associated with it known as "GroupState." In one embodiment, Table 3 shows the information is held in each individual GroupState:

TABLE 3

| Contents | Bits | Description |
| --- | --- | --- |
| GState | 8 | GState index |
| StartPrimID | ~24 | Starting API PrimID number |
| StartPrimSTID | ~11 | Starting PrimSTID number |
| PrimCount | ~8 | Number of primitives in PrimGroup (including culled ones) |
| QCM | 256-4 Kbits | Quad coverage mask (QCM) - For 32 × 32-128 × 128 tiles: number of bits dependent on tile size |
| PeqnTblEnd | 11 | Optional - Plane equation table end pointer |
| Prim | 3 | Optional - Primitive type: triangle, line, point (probably not required, in GState) |
| VvCount | 7 | Optional - Number of Vv per primitive - optional, since in GState |
| Opaque | 1 | Optional - Opaque/translucent - optional, extracted from GState |
| Total | ~307-4169 (39B-522B) | |

Figure 9:
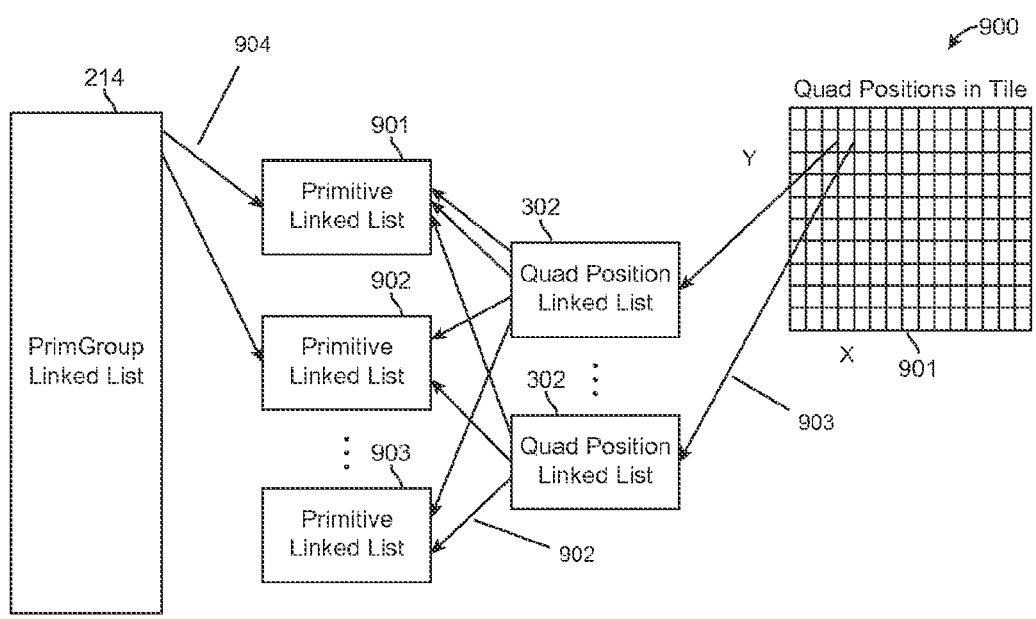
FIG. 9 shows example data structure architecture, according to an embodiment.

FIG. 9 shows example data structure architecture 900, according to an embodiment. In one embodiment, the data structure architecture comprises a PrimGroup linked list 214, primitive linked lists 901-903, Quad position linked lists 302 and Quad positions in Tile 901 showing Cartesian coordinates (X, Y). In one embodiment, the example arrows/links (902, 903 and 904) for the data structure architecture show the connections between the PrimGroup linked list 214, the primitive linked lists 901-903, the Quad position linked lists 302 and the Quad positions in the Tile 901. In one embodiment, when coverage of one or more quads is erased the surviving coverage may be represented as the arrows/links 902 remaining, while for one or more erased quads, the arrows/links 902 are considered broken and would be represented as removed arrows/links 902 in the data structure architecture. In one embodiment, the arrows/links 903 show the connection between the quad positions in the tile to the quad position linked list 302. In one embodiment, the arrows/links 904 show the connectivity between the primitive linked list and the PrimGroup linked list 214. In one embodiment, some structures are allocated per tile while others are allocated per vertex, primitive, quad or PrimGroup. In one embodiment, the data structures are logical structures. In one embodiment, the various fields may be located in separate locations but accessed with consistent indices (links are actually table indices). In one embodiment, physically, the fields are located near where they are actually accessed most frequently. In one example embodiment, the vertex and primitive use counters and are located in the ABuffer logic (e.g., operations unit 213) while the draw call access information is only required by the IA or TF units that read the attribute arrays.

In one embodiment, valid bits may be duplicated and copied if it saves power. In one embodiment, data in the structures are packed into multiple data arrays according to accessing stages or functions. In one embodiment, in general, sequential operations will tend to access data that has significant locality in the tables so separating data according to function will improve locality of access and reduce actual consumed GPU cache and/or on-chip RAM bandwidth. In one embodiment, data in the structures are compacted where feasible. In one embodiment, size of the tile may dictate minimum practical size of these structures.

In one embodiment, the vertex state table (VertexStateTbl) 203 holds vertex information in a circular buffer and is addressed through an index called a VertexID. In one embodiment, the VertexStateTbl 203 keeps track of specific vertex information. In one embodiment, the VertexStateTbl 203 contains the information shown in Table 4.

TABLE 4

| Contents | Bits | Description |
| --- | --- | --- |
| DrawcallID | ~8 | |
| VertexIndex | ~11 | |
| PrimitiveCount | 8 | Unused vertex when PrimitiveCount <1 |
| Pre-CCV (clip coordinates) position | 128 | Optional - (X, Y, Z, W) required if recomputed by the Color Phase |
| Post-CCV (screen coordinates) position | 96 | Optional - (X, Y, Z) - W is same as above - required if Viewport not repeated by Color Phase |
| Total | ~27-256 | |

In one embodiment, the pre-CCV data may be required by the Color Phase Vertex Shader. In one embodiment, this may be stored or re-computed from re-fetched attribute array data and passed to the Color Phase Vertex shader 205 (FIG. 3). In one embodiment, the post-CCV data is required to compute Vv plane equations. In one embodiment, this may be stored or recomputed from the clip coordinates.

In one embodiment, PrimitiveCount indicates how many primitives in the current tile use this vertex. In one embodiment, if the PrimitiveCount is <1, the vertex is no longer needed for further processing. In one embodiment, the Vertex Coverage Shader 202 (FIG. 3) output is required by the CCV 206 and the Color Vertex shader 205. In one embodiment, at a minimum, the vertices that are required by redundancy removal need to be accumulated before the CCV 206 may form primitives. In one embodiment, this data may be stored in TSP registers or another GPU on-chip memory location.

In one embodiment, the position information for particular primitives is accessed via its VertexIDs. In one embodiment, vertices in a given Warp will have the same GState and will have VertexIDs that are sequential at this stage. In one embodiment, primitives will be formed from the set within a Warp or sequential set of Warps. In one embodiment, clipped primitives may require extra support and generate new vertices from existing ones. In one embodiment, the Vv values for the new vertices will be required in the Color Phase. In one embodiment, barycentric values may be computed by the CCV 206 in the Coverage Phase or the CCV 206 may re-clip primitives in the Color Phase. In one embodiment, the data is organized into multiple data arrays based on pipeline stage access requirements.

In one embodiment, the primitive State table 209 (PrimitiveStateTbl) holds information required by the rendering phase pipelines for each resident primitive. In one embodiment, The PrimitiveStateTbl 209 structure is a circular buffer that is addressed using an index (PrimSTID). In one embodiment, the PrimitiveStateTble 209 is an extremely important data structure for control purposes. In one embodiment, every primitive with live coverage in the rendering phase has an identifying number which uniquely identifies its descriptor in the PrimitiveStateTbl 209. In one embodiment, the identifying numbers are the index into the PrimitiveStateTbl 209.

In one embodiment, primitives are contained in one and only one PrimGroup after the "PrimGroup Generation" stage. In one embodiment, primitives and related data are mostly managed according to PrimGroups in the rendering phase pipelines. In one embodiment, when quads are generated for a given primitive, the Quadcount value is incremented. In one embodiment, when quads are culled, this counter is decremented. In one embodiment, if the post-rasterization value of Quadcount is <1, the primitive is considered inactive (culled) and further processing is eliminated. In one embodiment, if a primitive is inactive (culled), the vertices that are used to form it are updated so that they are culled if they are no longer used by active primitives. In one embodiment, the PrimitiveStateTbl 209 may be divided into more than one structure to service different pipeline stages.

In one embodiment, the vertex tracking process includes structure entries that contain the following fields shown in Table 5 (note that some fields may not be valid until the primitive reaches certain rendering phase pipeline stages):

TABLE 5

| Contents | Bits | Description |
| --- | --- | --- |
| VertexID [3] | ~30-36 | |
| QuadCount | ~11 | number of "live" quads |
| PeqnIndex | ~15 | Plane equation table start index |
| Face | 1 | Backface/Frontface |
| Clipped | 1 | Primitive generated by clipping |
| VvSeup | 1 | Vv setup complete (used for control) |
| GState | 8 | Optional - GState index (probably not required, held in PrimGroup structure) |
| Prim | 3 | Optional - Primitive type: triangle, line, point (probably not required) |
| PrimGroup | ~8 | Optional - PrimGroup index (probably not required) |
| Total | ~58-77 | |

In one embodiment, minimal state storage in a main table for maximum tile size is shown in Table 6.

TABLE 6

| Contents | Bits | Description |
| --- | --- | --- |
| VertexID [3] | 36 | |
| QuadCount | 12 | number of "live" quads |
| Face | 1 | Backface/Frontface |
| Clipped | 1 | Primitive generated by clipping |
| Total | 50 | |

In one embodiment, the number of bits required in some fields for the primitive linking process will be determined by characterization and overall system design. In one example embodiment, the number of primitives supported by the PrimitiveStateTbl 209 determines the number of bits in the "Next" field, shown below in Table 7. In one embodiment, minimal state storage in a combined table for maximum tile size (128×128 pixels) is shown in Table 7.

TABLE 7

| Contents | Bits | Description |
| --- | --- | --- |
| PrimID | 12 | API Primitive ID (relative to PrimGroup start) |
| Next | 10 | Table entry for the next primitive in the PrimGroup |
| Prev | 10 | Table entry for the previous primitive in the PrimGroup |
| QuadCount | 12 | number of "live" quads |
| Face | 1 | Backface/Frontface |
| Clipped | 1 | Primitive generated by clipping |
| Total | 46 | |

In one embodiment, the ABuffer 215 holds modified quad structures for the current tile (X and Y are implicit by the quad location within the tile). In one embodiment, each quad location in the tile has a set of quad structures as defined and shown in Table 8.

TABLE 8

| Data Field | Bits | Description |
| --- | --- | --- |
| PrimSTID | 10 | Primitive ID |
| Coverage[4] | 4-64 | Coverage vectors for pixels in quad - 3 size depending on MSAA mode |
| Valid | 1 | Valid bit for cell |
| PrimGroup | 8 | Optional - PrimGroup ID - can be deduced from PrimSTID |
| Total | 15-83 | Bits per cell |

In one embodiment, Quad data fields are located using an index into arrays. In one embodiment, the size of the coverage array depends on MSAA mode (4X, 8X or 16X). In one embodiment, different fields are accessed for different purposes and may be accessed at different times. In one embodiment, packing different fields into different memory arrays simplifies access, enables faster processing and improves efficiency.

In one embodiment, the tile is arranged as a set of quad locations. In one embodiment, each location maps to a particular (X, Y) quad location in the rectangular tile. In one embodiment, it is ordered in X major order. In one embodiment, for 32×32 pixel tiles:
  256=16×16 quad locations are required
  2.5 KB=256*10B/quad for 1-deep sets (16X MSAA)
  1 KB=256*4B/quad for 1-deep sets (4X MSAA)
  0.5 KB=256*2B/quad for 1-deep sets (no MSAA).

In one embodiment, if up to an average depth of 8 quads is supported:
  20 KB is required for the ABuffer quads with 16×MSAA
  8 KB is required for the ABuffer quads with 4×MSAA
  4 KB is required for the ABuffer quads with no MSAA.

In one embodiment, an average depth should be <2 for typical conditions. In one embodiment, the following cases may result in deeper set usage: when multiple primitive edges pass through a quad, especially when a quad encloses the center point of a fan; and when transparent objects are nearer the eye than opaque objects. In one embodiment, statistics may be used, but a set depth of eight (8) should be conservative except for the fan center point case. In one embodiment, when the sets fill up, the ABuffer 215 needs to be flushed. In one embodiment, if flushing due to this case is common, performance will be reduced and a mechanism supporting a limited number of deeper sets may be added. In one embodiment, a linked list approach with allocation of entries may be used rather than sets dedicated a given location, but this will be less efficient for access and may limit performance.

In one embodiment, a cache type structure is used to allow much larger arrays to be supported by the hardware than the actual amount of physical memory provided. Various cache structures can be contemplated and used to extend these arrays.

In one embodiment, the plane equation coefficient table includes the plane equation coefficient values that are generated during Vv setup 210 and remain in a circular buffer until the PrimGroup they belong to is retired. In one embodiment, the vertex values are stored in the Warp register file outputs until consumed by the Vv setup stage. In one embodiment, the primitive structure holds a pointer to the first plane equation for the primitive. In one embodiment, the plane equations are held in a circular buffer according to the PrimSTID. In one embodiment, the number of plane equations required per primitive is a function of the number of Vv values (plus 1/W & Z) which is specified by the GState. In one embodiment, the head pointer is controlled by the Vv setup stage but the tail pointer is changed when a given PrimGroup is completed. In one embodiment, the new tail pointer is moved to point to the first Peqn position of the first primitive in the next PrimGroup unless there are no more active PrimGroups, in which case it is set to 0. In one example embodiment, it is not necessary to generate coefficients for the whole Color Phase pipeline at any given time. In one embodiment, coefficients for a limited number of PrimGroups will be required at any given time, so they may be loaded directly into the interpolator units by the pixel shader setup stage before starting up the Warps for the PrimGroup.

Figure 10:
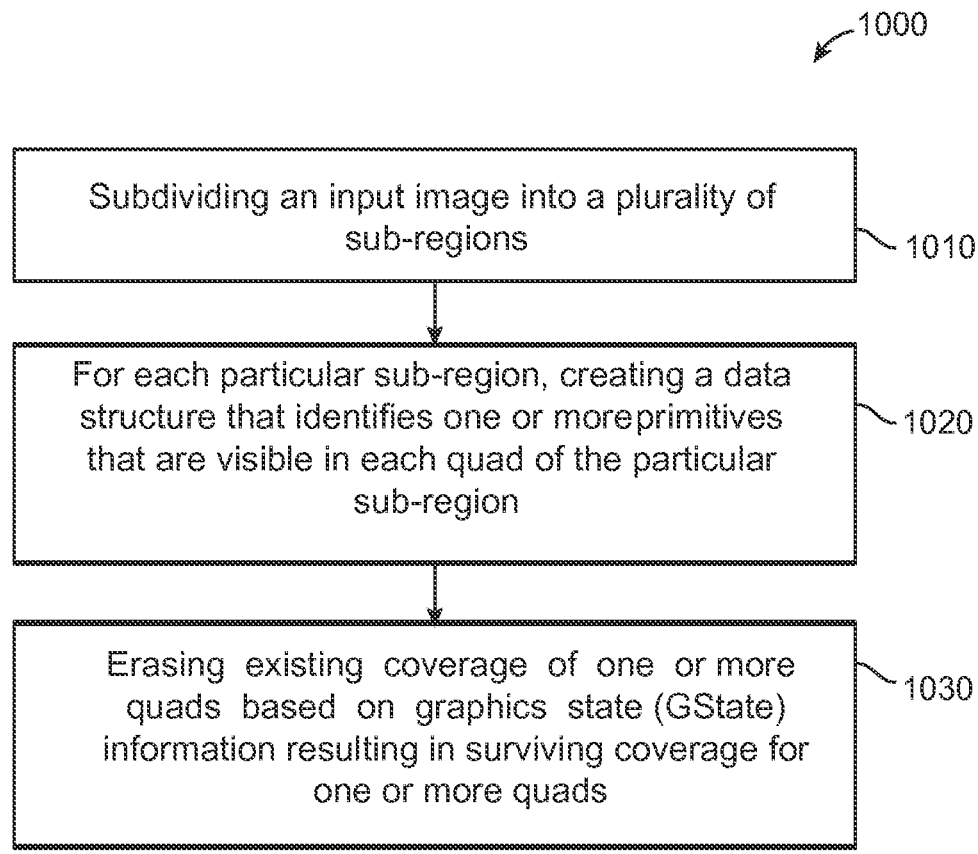
FIG. 10 shows a block diagram for a process for reduction of GPU processing based on coverage testing, reduced data fetching and reduced pixel shader processing.

FIG. 10 shows a block diagram for a process 1000 for reduction of GPU processing based on coverage testing, reduced data fetching and reduced pixel shader processing. In one embodiment, in block 1010 an input image is subdivided into a plurality of sub-regions. In one embodiment, in block 1020, for each particular sub-regions, a data structure is created that identifies one or more primitives that are visible in each quad of the particular sub-region. In one embodiment, in block 1030 existing coverage of one or more quads is erased based on GState information resulting in surviving coverage for one or more quads.

In one embodiment, process 1000 may further include using a particular first pixel shader if required based on GState information and computing color values using a particular second shader for quads with samples that have surviving coverage. In one embodiment, process 1000 may further include generating a rendered image using output color values of the second particular shader. In one embodiment, creating the data structure further includes using an input stream of image elements by processing the input image, wherein each primitive is identified by a linear identification (ID) or hierarchical linear ID.

In one embodiment, the graphics processor is used for independently performing graphics pipeline processing for the one or more primitives for each sub-region. In one embodiment, the processed primitives are rasterized into quads or hierarchical blocks of quads.

In one embodiment, process 1000 further includes storing one or more particular quads that have coverage according to position within a sub-region associated with the one or more particular quads. In one embodiment, the process 1000 may include grouping primitives based on GState information, storing one or more quads using one or more of a primitive index, a sample coverage mask, and a group index, and tracking primitives and GState information with surviving coverage, wherein the second particular shader comprises a color-only pixel shader.

In one embodiment, for process 1000, primitive groups may include no primitive overlap. In one embodiment, the rendered image comprises of a three-dimensional (3-D) image. In one embodiment, a primitive comprises one or more of a three vertex triangle, points, one or more lines or any other triangle primitive, and a data structure used for quads comprises a two-dimensional array of quad positions, where a tile position==(x, y) origin of a quad within a tile, where (x, y) refers to Cartesian coordinates, and each position in a tile points to a list of quads having coverage within the primitive that contributes to the rendered image. In one embodiment, GState information comprises a dynamic state associated with a draw call or set of draw calls that changes over time within an image. In one embodiment, the process 1000 is performed by an electronic device that comprises a mobile electronic device.

In one embodiment, the vertex position shaders only compute position plus attributes required by late-Z position shaders, and comprises the same vertex position shader as used during binning (minus texture attribute processing). In one or more embodiment, the pixel shader computes: pixel kill, modified Z, and alpha-to-coverage. In one embodiment, vertex position shaders are computed multiple times, but save pixel shaders which is a benefit as there are typically many more pixels than vertices. In one embodiment, pixel position shaders guarantee a correct operation even for late-Z cases. In one embodiment, data is organized and stored by quad and quad location in a tile. In one embodiment, computation is performed in the shaders by threads packed into quads. In one embodiment, quads share storage for all samples within the quad.

In one embodiment, hardware implementations may readily parallelize work as operations on adjacent quad positions may be performed in parallel and independently. In one embodiment, for primitive groups, color pass rendering is supported without re-rasterization. In one embodiment, pixel shader threads from multiple primitives are allowed to be packed together which improves efficiency of the color pass and simplifies extraction of pixel shader threads for the color pass.

In one embodiment, maintenance of PrimGroup masks is optional, with trade-offs. In one embodiment, linked-list data structures support efficient storage utilization, and support multiple layers of transparency without breaking the coverage pass. In one embodiment, depth and stencil tests are performed only one time, so all stencil programming and order cases operate correctly. In one embodiment, attribute fetch traffic is minimized because only primitives with remaining coverage are fetched during the Color Pass.

Figure 11:
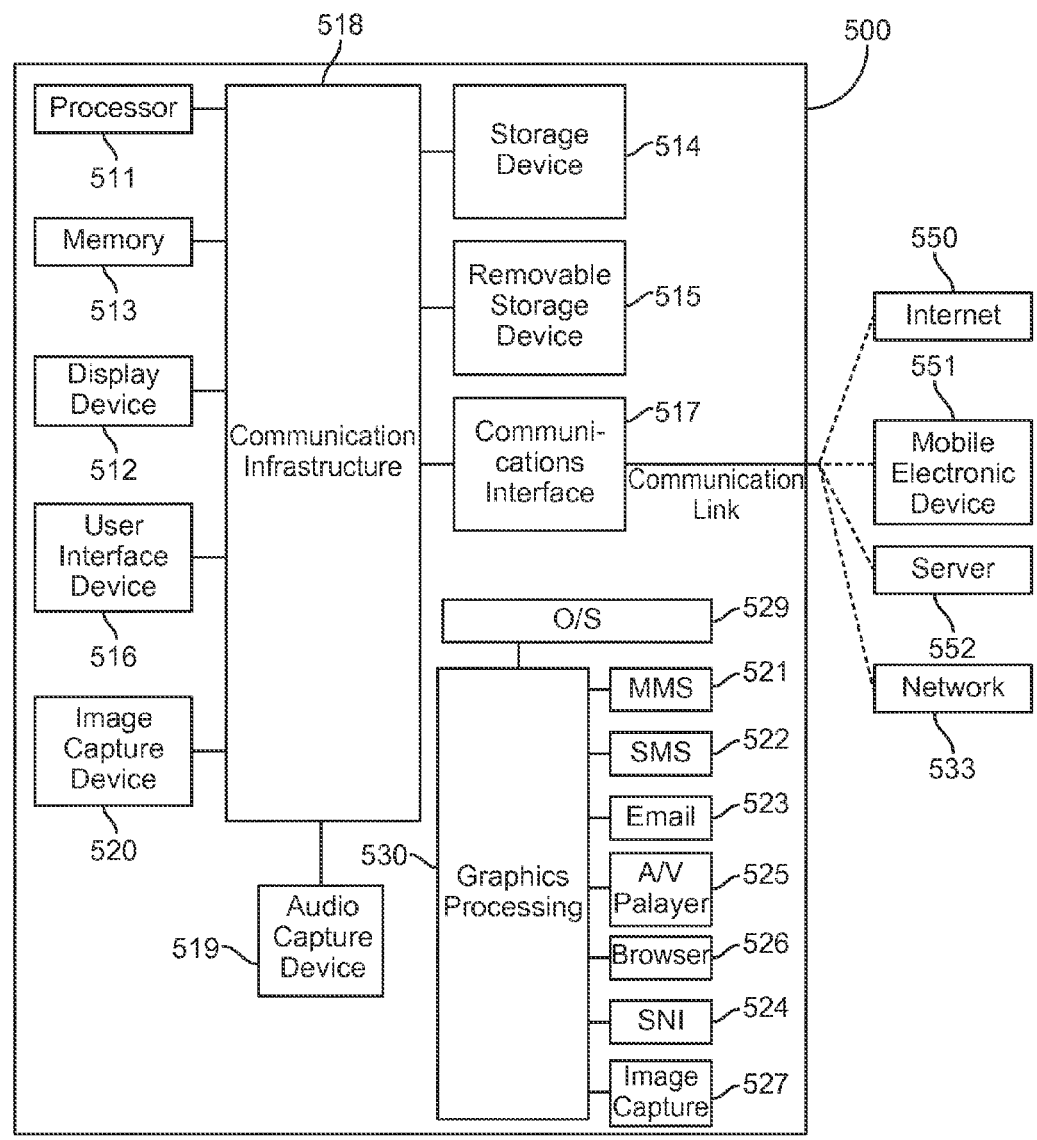
FIG. 11 is a high-level block diagram showing an information processing system comprising a computing system implementing one or more embodiments.

FIG. 11 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, fabric, cross-bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a graphics processing module 530 that may implement processing similar as described regarding data flows 200 (FIG. 3), 300 (FIG. 4), 400 (FIG. 5) and 600 (FIG. 6). In one embodiment, the graphics processing module 530 may implement the process of flowchart 1000 (FIG. 10). In one embodiment, the graphics processing module 530 along with an operating system 529 may be implemented as executable code residing in a memory of the system 500. In another embodiment, the graphics processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, solid state drive (SSD), etc. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   at a graphics processor for an electronic device:
   subdividing an input image into a plurality of sub-regions;
   for each sub-region, creating a corresponding data structure identifying one or more primitives that are visible in each quad of the sub-region;
   erasing existing coverage of one or more quads of the plurality of sub-regions based on state information associated with rendering of graphics by the graphics processor, resulting in surviving coverage for one or more remaining quads of the plurality of sub-regions;
   grouping primitives in the one or more remaining quads that have surviving coverage into at least one primitive group based on the state information, wherein each primitive group comprises a set of primitives that do not overlap;
selectively using a first pixel shader based on the state information; and
computing color values using a second pixel shader for one or more quads with samples that have surviving coverage, wherein the second pixel shader comprises a color-only pixel shader.

2. The method of claim 1, further comprising:
generating a rendered image using the color values;
wherein, for each sub-region, creating a corresponding data structure comprises using an input stream of image elements by processing the input image; and
wherein each primitive is identified by a linear identification (ID) or hierarchical linear ID.

3. The method of claim 2, further comprising:
for each sub-region, independently performing graphics pipeline processing for one or more primitives of the sub-region.

4. The method of claim 3, wherein, for each sub-region, one or more primitives of the sub-region are rasterized into quads or hierarchical blocks of quads.

5. The method of claim 4, further comprising:
storing the one or more remaining quads that have surviving coverage according to position within a sub-region associated with the one or more remaining quads.

6. A method comprising:
at a graphics processor for an electronic device:
subdividing an input image into a plurality of sub-regions;
for each sub-region, creating a corresponding data structure identifying one or more primitives that are visible in each quad of the sub-region;
erasing existing coverage of one or more quads of the plurality of sub-regions based on state information associated with rendering of graphics by the graphics processor, resulting in surviving coverage for one or more remaining quads of the plurality of sub-regions;
grouping primitives in the one or more remaining quads that have surviving coverage into at least one primitive group based on the state information, wherein each primitive group comprises a set of primitives that do not overlap;
storing the one or more remaining quads using one or more of a primitive index, a sample coverage mask, and a group index; and
tracking primitives in the one or more remaining quads that have surviving coverage.

7. The method of claim 2, wherein the rendered image comprises a three-dimensional (3-D) image.

8. A method comprising:
at a graphics processor for an electronic device:
subdividing an input image into a plurality of sub-regions;
for each sub-region, creating a corresponding data structure identifying one or more primitives that are visible in each quad of the sub-region;
erasing existing coverage of one or more quads of the plurality of sub-regions based on state information associated with rendering of graphics by the graphics processor, resulting in surviving coverage for one or more remaining quads of the plurality of sub-regions;
grouping primitives in the one or more remaining quads that have surviving coverage into at least one primitive group based on the state information, wherein each primitive group comprises a set of primitives that do not overlap, wherein:
a primitive comprises one or more of a three vertex triangle, points, one or more lines, or a triangle primitive; and
a data structure comprises a two-dimensional array of quad positions, where a tile position=(x, y) origin of a quad within a tile, where (x, y) refers to Cartesian coordinates, and where each position in a tile points to a list of quads that have surviving coverage within the tile that contributes to the rendered image.

9. The method of claim 1, wherein the state information comprises a dynamic state associated with a draw call or set of draw calls that changes over time within an image.

10. The method of claim 1, wherein the electronic device comprises a mobile electronic device.

11. A non-transitory computer-readable medium having instructions which when executed on a computer perform a method comprising:
at a graphics processor for an electronic device:
subdividing an input image into a plurality of sub-regions;
for each sub-region, creating a corresponding data structure identifying one or more primitives that are visible in each quad of the sub-region;
erasing existing coverage of one or more quads of the plurality of sub-regions based on state information associated with rendering of graphics by the graphics processor, resulting in surviving coverage for one or more remaining quads of the plurality of sub-regions;
grouping primitives in the one or more remaining quads that have surviving coverage into at least one primitive group based on the state information, wherein each primitive group comprises a set of primitives that do not overlap;
storing the one or more remaining quads that have surviving coverage according to position within a sub-region associated with the one or more remaining quads;
storing the one or more remaining quads using one or more of a primitive index, a sample coverage mask, and a group index; and
tracking primitives in the one or more remaining quads that have surviving coverage.

12. The medium of claim 11, further comprising:
selectively using a first pixel shader based on the state information; and
computing color values using a second pixel shader for one or more quads with samples that have surviving coverage;
wherein, for each sub-region, creating a corresponding data structure comprises using an input stream of image elements by processing the input image; and
wherein each primitive is identified by a linear identification (ID) or hierarchical linear ID.

13. The medium of claim 12, further comprising:
for each sub-region, independently performing graphics pipeline processing for one or more primitives of the sub-region.

14. The medium of claim 13, wherein, for each sub-region, one or more primitives of the sub-region are rasterized into quads or hierarchical blocks of quads.

15. The medium of claim 12, wherein the second pixel shader comprises a color-only pixel shader, and the rendered image comprises a three-dimensional (3-D) image.

16. The medium of claim 11, wherein:
a primitive comprises one or more of a three vertex triangle, points, one or more lines, or a triangle primitive;
a data structure comprises a two-dimensional array of quad positions, where a tile position=(x, y) origin of a quad within a tile, where (x, y) refers to Cartesian coordinates, and where each position in a tile points to a list of quads that have surviving coverage within the tile that contributes to the rendered image; and
the state information comprises a dynamic state associated with a draw call or set of draw calls that changes over time within an image.

17. The medium of claim 11, wherein electronic device comprises a mobile electronic device.

18. A graphics processor for an electronic device comprising: one or more processors coupled to a memory storing instructions that when executed by the one or more processors causes the one or more processors to perform operations comprising:
subdividing an input image into a plurality of sub-regions;
for each sub-region, creating a corresponding data structure identifying one or more primitives that are visible in each quad of the sub-region;
in a first graphics processing stage, erasing existing coverage of one or more quads based on state information associated with rendering of graphics by the graphics processor, resulting in surviving coverage for one or more remaining quads of the plurality of sub-regions;
grouping primitives in the one or more remaining quads that have surviving coverage into at least one primitive group based on the state information, wherein each primitive group comprises a set of primitives that do not overlap;
in the first graphics processing stage, storing the one or more remaining quads using one or more of a primitive index, a sample coverage mask, and a group index; and
tracking primitives in the one or more remaining quads that have surviving coverage.

19. The graphics processor of claim 18, wherein the operations further comprise:
for each sub-region, creating a corresponding data structure using an input stream of image elements by processing the input image, wherein each primitive is identified by a linear identification (ID) or hierarchical linear ID.

20. The graphics processor of claim 19, wherein the operations further comprise:
in the first graphics processing stage, for each sub-region, independently performing graphics pipeline processing for one or more primitives of the sub-region.

21. The graphics processor of claim 20, wherein the operations further comprise:
in the first graphics processing stage, selectively utilizing a first pixel shader based on the state information; and
in a second graphics processing stage, computing color values using a second pixel shader for one or more quads with samples that have surviving coverage;
wherein, for each sub-region, one or more primitives of the sub-region are rasterized into quads or hierarchical blocks of quads.

22. The graphics processor of claim 21, wherein the operations further comprise:
in the first graphics processing stage further, storing the one or more remaining quads that have surviving coverage according to position within a sub-region associated with the one or more remaining quads.

23. The graphics processor of claim 21, wherein the second pixel shader comprises a color-only pixel shader, and the rendered image comprises a three-dimensional (3-D) image.

24. The graphics processor of claim 23, wherein:
a primitive comprises one or more of a three vertex triangle, points, one or more lines, or a triangle primitive;
a data structure comprises a two-dimensional array of quad positions, where a tile position=(x, y) origin of a quad within a tile, where (x, y) refers to Cartesian coordinates, and where each position in a tile points to a list of quads that have surviving coverage within the tile that contributes to the rendered image; and
the state information comprises a dynamic state associated with a draw call or set of draw calls that changes over time within an image.

25. The graphics processor of claim 18, wherein the graphics processor is used by a mobile electronic device.

26. The graphics processor of claim 25, wherein the mobile electronic device comprises one or more of a mobile telephone, a tablet device, a wearable device and a mobile computing device.

* * * * *